United States Patent …

(12) United States Patent
Cao et al.

(10) Patent No.: US 10,651,747 B2
(45) Date of Patent: May 12, 2020

(54) SYSTEMS AND METHODS WITH TIMING CONTROL FOR SYNCHRONIZATION RECTIFIER CONTROLLERS

(71) Applicant: ON-BRIGHT ELECTRONICS (SHANGHAI) CO., LTD., Shanghai (CN)

(72) Inventors: Yaming Cao, Shanghai (CN); Qiang Luo, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/117,698

(22) Filed: Aug. 30, 2018

(65) Prior Publication Data
US 2019/0068073 A1    Feb. 28, 2019

Related U.S. Application Data

(63) Continuation of application No. 15/461,283, filed on Mar. 16, 2017, now Pat. No. 10,148,189.

(30) Foreign Application Priority Data

Feb. 24, 2017    (CN) .......................... 2017 1 0102817

(51) Int. Cl.
*H02M 3/335*    (2006.01)
*H02M 1/44*    (2007.01)
(Continued)

(52) U.S. Cl.
CPC ......... *H02M 3/33592* (2013.01); *H02M 1/08* (2013.01); *H02M 1/38* (2013.01);
(Continued)

(58) Field of Classification Search
CPC ......... H02M 3/33538; H02M 3/33546; H02M 3/33515; H02M 3/33576; H02M 3/33553;
(Continued)

(56) References Cited

U.S. PATENT DOCUMENTS 6,069,804 A    5/2000 Ingman et al.
6,091,233 A    7/2000 Hwang et al.
(Continued)

FOREIGN PATENT DOCUMENTS

CN    2529442 Y    1/2003
CN    101106333 A    1/2008
(Continued)

OTHER PUBLICATIONS

Chinese Patent Office, Office Action dated Jan. 26, 2014, in Application No. 201210118202.7.
(Continued)

*Primary Examiner* — Bryan R Perez
(74) *Attorney, Agent, or Firm* — Faegre Drinker Biddle & Reath LLP

(57) ABSTRACT

System controller and method for regulating a power converter. For example, the system controller includes a first controller terminal and a second controller terminal. The system controller is configured to: receive, at the first controller terminal, an input signal; generate a drive signal based at least in part on the input signal, the drive signal being associated with an on-time period and an off-time period, the on-time period including a first beginning and a first end; and output, at the second controller terminal, the drive signal to a switch to close the switch during the on-time period and open the switch during the off-time period to affect a current associated with a secondary winding of the power converter. The system controller is further configured to detect a demagnetization period associated
(Continued)

with the secondary winding based at least in part on the input signal.

27 Claims, 8 Drawing Sheets

(51) Int. Cl.
*H02M 1/08* (2006.01)
*H02M 1/38* (2007.01)
*H02M 1/00* (2006.01)

(52) U.S. Cl.
CPC ............ *H02M 1/44* (2013.01); *H02M 3/335* (2013.01); *H02M 2001/0009* (2013.01); *Y02B 70/1475* (2013.01)

(58) Field of Classification Search
CPC ......... H02M 3/33507; H02M 3/33592; H02M 3/33523; H02M 3/3353; H02M 3/33569
USPC .................................. 363/21.06, 21.14, 127
See application file for complete search history.

(56) References Cited

U.S. PATENT DOCUMENTS

| | | | |
|---|---|---|---|
| 6,198,638 | B1 | 3/2001 | Lee |
| 6,972,969 | B1 | 12/2005 | Shteynberg et al. |
| 7,173,835 | B1 | 2/2007 | Yang |
| 7,447,049 | B2 | 11/2008 | Garner et al. |
| 7,768,801 | B2 | 8/2010 | Usui et al. |
| 7,791,903 | B2 | 9/2010 | Zhang et al. |
| 7,826,237 | B2 | 11/2010 | Zhang et al. |
| 7,952,894 | B2 | 5/2011 | Lin et al. |
| 8,102,676 | B2 | 1/2012 | Huynh et al. |
| 8,134,851 | B2 | 3/2012 | Soldano et al. |
| 8,391,028 | B2 | 3/2013 | Yeh |
| 8,542,507 | B2 | 9/2013 | Hsu et al. |
| 8,570,772 | B2 | 10/2013 | Morris et al. |
| 8,953,342 | B2 | 2/2015 | Fang |
| 9,413,246 | B2 | 8/2016 | Luo et al. |
| 9,595,874 | B2 | 3/2017 | Cao et al. |
| 9,602,006 | B2 | 3/2017 | Fahlenkamp |
| 9,787,198 | B1 | 10/2017 | Cao et al. |
| 10,063,153 | B2 | 8/2018 | Fang |
| 10,122,284 | B2 | 11/2018 | Fang |
| 10,148,189 | B2 | 12/2018 | Cao et al. |
| 10,193,451 | B2 | 1/2019 | Luo et al. |
| 10,411,604 | B2 | 9/2019 | Cao et al. |
| 10,411,605 | B2 | 9/2019 | Cao et al. |
| 2002/0114172 | A1 | 8/2002 | Webb et al. |
| 2004/0125621 | A1 | 7/2004 | Yang et al. |
| 2005/0024897 | A1 | 2/2005 | Yang et al. |
| 2006/0018135 | A1 | 1/2006 | Yang et al. |
| 2007/0139095 | A1 | 6/2007 | Fang et al. |
| 2008/0037302 | A1 | 2/2008 | Yang et al. |
| 2009/0168464 | A1 | 7/2009 | Lin et al. |
| 2009/0257644 | A1 | 10/2009 | Dodzin et al. |
| 2009/0322300 | A1 | 12/2009 | Melanson et al. |
| 2010/0219802 | A1 | 9/2010 | Lin et al. |
| 2011/0002145 | A1 | 1/2011 | Halberstadt |
| 2011/0169463 | A1 | 7/2011 | Yang et al. |
| 2011/0305055 | A1 | 12/2011 | Hsu et al. |
| 2012/0032708 | A1 | 2/2012 | Coleman |
| 2013/0033236 | A1 | 2/2013 | Li et al. |
| 2013/0235620 | A1 | 9/2013 | Morris et al. |
| 2013/0258723 | A1 | 10/2013 | Fang et al. |
| 2013/0272036 | A1 | 10/2013 | Fang |
| 2014/0021786 | A1 | 1/2014 | Fang |
| 2014/0218976 | A1 | 8/2014 | Luo et al. |
| 2015/0070944 | A1 | 3/2015 | Fang |
| 2015/0229223 | A1 | 8/2015 | Cao et al. |
| 2015/0280584 | A1 | 10/2015 | Gong et al. |
| 2016/0149499 | A1 | 5/2016 | Fang |
| 2016/0322909 | A1 | 11/2016 | Cao et al. |
| 2017/0005578 | A1 | 1/2017 | Luo et al. |
| 2017/0126138 | A1 | 5/2017 | Cao et al. |
| 2018/0013352 | A1 | 1/2018 | Cao et al. |
| 2018/0034377 | A1 | 2/2018 | Cao et al. |
| 2018/0076720 | A1 | 3/2018 | Cao et al. |
| 2018/0248488 | A1* | 8/2018 | Cao .................. H02M 3/33592 |

FOREIGN PATENT DOCUMENTS

| | | |
|---|---|---|
| CN | 101188384 A | 5/2008 |
| CN | 101378232 A | 3/2009 |
| CN | 102017376 A | 4/2011 |
| CN | 102104338 A | 6/2011 |
| CN | 102217181 | 10/2011 |
| CN | 102231605 A | 11/2011 |
| CN | 102647074 A | 8/2012 |
| CN | 102723856 A | 10/2012 |
| CN | 102790531 A | 11/2012 |
| CN | 103296867 A | 9/2013 |
| CN | 103728572 A | 4/2014 |
| CN | 103887980 A | 6/2014 |
| CN | 102185501 B | 9/2014 |
| CN | 104393763 A | 3/2015 |
| CN | 103378751 A | 4/2015 |
| CN | 105322800 A | 2/2016 |
| CN | 106026703 A | 5/2016 |
| EP | 2525480 A1 | 11/2012 |
| JP | 2000-014136 A | 1/2000 |
| JP | 2007-28894 A | 2/2007 |
| JP | 2009-261042 A | 11/2009 |
| JP | 2009-278717 A | 11/2009 |
| TW | I 366335 | 6/2012 |
| TW | 201234854 A | 8/2012 |
| TW | I 401866 | 7/2013 |
| TW | I 436571 | 5/2014 |
| TW | 201521347 | 6/2015 |
| TW | I 489751 | 6/2015 |
| TW | 201537882 | 10/2015 |
| TW | I 509971 | 11/2015 |
| TW | 201707361 | 2/2017 |

OTHER PUBLICATIONS

Chinese Patent Office, Office Action dated Oct. 28, 2015, in Application No. 201410093010.4.
Chinese Patent Office, Office Action dated May 25, 2016, in Application No. 201410729533.3.
Chinese Patent Office, Office Action dated Dec. 20, 2017, in Application No. 201610345719.8.
Chinese Patent Office, Office Action dated Sep. 4, 2018, in Application No. 201710102817.3.
Chinese Patent Office, Office Action dated Nov. 9, 2018, in Application No. 201710534527.6.
Li, Longwen, "Newest Switch Power Supply Design Procedures and Steps," Chapter 8, Section 4, pp. 455-458, 2008.
Liu, Shengli, "Practical New Technology of High Frequency Switch Power Supply," Chapter 6, pp. 100-117, 2006.
Taiwan Intellectual Property Office, Office Action dated Oct. 9, 2014, in Application No. 101118860.
Taiwan Intellectual Property Office, Office Action dated Dec. 2, 2016, in Application No. 104101330.
Taiwan Intellectual Property Office, Office Action dated May 4, 2017, in Application No. 105122491.
Taiwan Intellectual Property Office, Office Action dated Dec. 27, 2017, in Application No. 106111598.
Taiwan Intellectual Property Office, Office Action dated Oct. 24, 2018, in Application No. 106140199.
United States Patent and Trademark Office, Office Action dated Sep. 28, 2017, in U.S. Appl. No. 15/204,324.
United States Patent and Trademark Office, Office Action dated Apr. 11, 2017, in U.S. Appl. No. 15/200,948.
United States Patent and Trademark Office, Office Action dated Dec. 12, 2017, in U.S. Appl. No. 15/200,948.
United States Patent and Trademark Office, Notice of Allowance dated Jun. 15, 2018, in U.S. Appl. No. 15/200,948.

(56) References Cited

OTHER PUBLICATIONS

United States Patent and Trademark Office, Office Action dated Oct. 3, 2017, in U.S. Appl. No. 15/353,426.
United States Patent and Trademark Office, Office Action dated Sep. 24, 2018, in U.S. Appl. No. 15/353,426.
United States Patent and Trademark Office, Office Action dated Jan. 5, 2018, in U.S. Appl. No. 15/685,382.
United States Patent and Trademark Office, Office Action dated Nov. 9, 2018, in U.S. Appl. No. 15/685,382.
Beijing East IP Ltd., Statement attached With Mailing List, submitted to the State Intellectual Property Office of China on Apr. 29, 2015, and resubmitted to the State Intellectual Property Office of China on Nov. 18, 2015, requesting correction of the filing date for Chinese Patent Application No. 201210118202.7.
State Intellectual Property Office of China, print-out of bibliographic data from http://cpquery.sipo.gov.cn of Chinese Patent Application No. 201210118202.7; dated Feb. 25, 2016.
United States Patent and Trademark Office, Notice of Allowance dated Apr. 29, 2019, in U.S. Appl. No. 15/665,264.
United States Patent and Trademark Office, Office Action dated Jun. 27, 2019, in U.S. Appl. No. 15/665,264.
United States Patent and Trademark Office, Notice of Allowance dated Apr. 8, 2019, in U.S. Appl. No. 15/685,382.
United States Patent and Trademark Office, Notice of Allowance dated Jun. 12, 2019, in U.S. Appl. No. 15/685,382.
United States Patent and Trademark Office, Office Action dated Jun. 24, 2019, in U.S. Appl. No. 15/719,283.
Beijing East IP Ltd., Statement attached with copy of a Mailing List, submitted to the State Intellectual Property Office of China dated Apr. 29, 2015, and resubmitted to the State Intellectual Property Office of China dated Nov. 18, 2015, requesting correction of the filing date for Chinese Patent Application No. 201210118202.7.
State Intellectual Property Office of China, Formal Letter of Examination dated Dec. 2, 2015, in Application No. 201210118202.7.
State Intellectual Property Office of China, print-out bibliographic data from http://cpquery.sipo.gov.cn of Chinese Patent Application No. 201210118202.7, dated Feb. 25, 2016.
United States Patent and Trademark Office, Notice of Allowance dated Nov. 14, 2019, in U.S. Appl. No. 15/665,264.
United States Patent and Trademark Office, Notice of Allowance dated Nov. 14, 2019, in U.S. Appl. No. 15/719,283.
United States Patent and Trademark Office, Office Action dated Jan. 10, 2020, in U.S. Appl. No. 16/503,916.

* cited by examiner

SYSTEMS AND METHODS WITH TIMING CONTROL FOR SYNCHRONIZATION RECTIFIER CONTROLLERS

1. CROSS-REFERENCES TO RELATED APPLICATIONS

This application is a continuation of U.S. patent application Ser. No. 15/461,283, filed Mar. 16, 2017, which claims priority to Chinese Patent Application No. 201710102817.3, filed Feb. 24, 2017, both of the above-referenced applications being incorporated by reference herein for all purposes.

2. BACKGROUND OF THE INVENTION

Certain embodiments of the present invention are directed to integrated circuits. More particularly, some embodiments of the invention provide systems and methods with timing control for synchronization rectifier controllers. Merely by way of example, some embodiments of the invention have been applied to power converters operating under continuous conduction mode. But it would be recognized that the invention has a much broader range of applicability.

Conventional secondary-side synchronization rectifier (SR) controllers often are used as parts of power conversion systems. These conventional power conversion systems usually need to support multiple modes of operation. The modes of operation include discontinuous conduction mode (DCM), quasi-resonant mode (QR) and continuous conduction mode (CCM).

FIG. 1 is a simplified diagram showing a conventional flyback power conversion system with a conventional secondary-side synchronization rectifier (SR) controller. The power conversion system 100 (e.g., a power converter) includes an electromagnetic interference (EMI) filter 101, a rectifying bridge 102, capacitors 103 and 107, resistors 105 and 106, a diode 109, a primary winding 112, a secondary winding 114, a primary-side pulse-width-modulation (PWM) controller 120 (e.g., a chip), a secondary-side synchronization rectifier (SR) controller 130 (e.g., a chip), a primary-side switch 142 (e.g., a transistor), a secondary-side switch 144 (e.g., a transistor), an output resistive load 152, and an output capacitive load 154.

The primary-side PWM controller 120 generates a drive signal 121. The drive signal 121 is received by the switch 142 (e.g., a transistor) and is used to close or open the switch 142 (e.g., to turn on or off a transistor) to affect a current 141 flowing through the primary winding 112. Additionally, the secondary-side SR controller 130 (e.g., a chip) includes a controller terminal 138 (e.g., a pin) and a controller terminal 139 (e.g., a pin). The secondary-side SR controller 130 receives, at the controller terminal 138, a signal 131 (e.g., $V_d$) from the drain terminal of the transistor 144 (e.g., a MOSFET transistor), generates a drive signal 137 (e.g., $V_g$), and outputs, at the controller terminal 139, the drive signal 137 to the transistor 144. The drive signal 137 is received by the gate terminal of the transistor 144 and is used to turn on or off the transistor 144 to affect a current 146 flowing through the secondary winding 114.

As shown in FIG. 1, the secondary-side SR controller 130 includes a drain-voltage detector 132, a logic controller 134, and a gate driver 136. The drain-voltage detector 132 receives the signal 131 (e.g., $V_d$) from the drain terminal of the transistor 144, detects the received signal 131, and generates a detection signal 133. The detection signal 133 is received by the logic controller 134, which in response generates a control signal 135. The gate driver 136 receives the control signal 135 and outputs the drive signal 137 (e.g., $V_g$) to the gate terminal of the transistor 144. The drive signal 137 (e.g., $V_g$) is generated based at least in part on the detected signal 131 (e.g., $V_d$), and is used to turn on or off the transistor 144. If the drive signal 137 is at a logic high level, the transistor 144 is turned on, and if the drive signal 137 is at a logic low level, the transistor 144 is turned off.

FIG. 2 is a simplified diagram showing certain conventional components of the secondary-side synchronization rectifier controller 130 of the power conversion system 100. The drain-voltage detector 132 includes comparators 210 and 220. The comparator 210 receives the signal 131 (e.g., $V_d$) and a threshold signal 212 (e.g., $V_{th\_on}$) and generates a comparison signal 214. The comparator 220 receives the signal 131 (e.g., $V_d$) and a threshold signal 222 (e.g., $V_{th\_off}$) and generates a comparison signal 224. The detection signal 133 includes comparison signals 214 and 224.

As shown in FIGS. 1 and 2, when the power conversion system 100 operates under the DCM mode or the QR mode, the drive signal 137 changes from the logic low level to the logic high level and the transistor 144 changes from being turned off to being turned on, if the detected signal 131 (e.g., $V_d$) drops below the threshold signal 212 (e.g., $V_{th\_on}$) and the comparison signal 214 changes from the logic low level to the logic high level. Also, when the power conversion system 100 operates under the DCM mode or the QR mode, the drive signal 137 changes from the logic high level to the logic low level and the transistor 144 changes from being turned on to being turned off, if the detected signal 131 (e.g., $V_d$) rises above the threshold signal 222 (e.g., $V_{th\_off}$) and the comparison signal 224 changes from the logic high level to the logic low level.

For example, the threshold signal 222 (e.g., $V_{th\_off}$) is close to 0 V (e.g., being equal to -15 mV), so the detected signal 131 (e.g., $V_d$) rises above the threshold signal 222 (e.g., $V_{th\_off}$) and the comparison signal 224 changes from the logic high level to the logic low level at the end of the demagnetization period when a secondary current 116 that flows through the secondary winding 114 becomes sufficiently small in magnitude. In another example, when the power conversion system 100 operates under the DCM mode or the QR mode, the transistor 144 becomes turned off before the transistor 142 becomes turned on.

For a flyback power conversion system with a secondary-side synchronization rectifier (SR) controller, the accurate control of the timing for opening a secondary-side switch (e.g., turning off a transistor) often is important. Under the CCM mode, however, the control mechanisms as implemented in FIGS. 1 and 2 usually are not applicable. Hence it is highly desirable to improve the techniques related to secondary-side synchronization rectifier controllers.

3. BRIEF SUMMARY OF THE INVENTION

Certain embodiments of the present invention are directed to integrated circuits. More particularly, some embodiments of the invention provide systems and methods with timing control for synchronization rectifier controllers. Merely by way of example, some embodiments of the invention have been applied to power converters operating under continuous conduction mode. But it would be recognized that the invention has a much broader range of applicability.

According to one embodiment, a system controller for regulating a power converter includes a first controller terminal and a second controller terminal. The system controller is configured to: receive, at the first controller terminal, an input signal; generate a drive signal based at least in part on the input signal, the drive signal being associated with an on-time period and an off-time period, the on-time period including a first beginning and a first end; and output, at the second controller terminal, the drive signal to a switch to close the switch during the on-time period and open the switch during the off-time period to affect a current associated with a secondary winding of the power converter. The system controller is further configured to: detect a demagnetization period associated with the secondary winding based at least in part on the input signal, the demagnetization period including a second beginning and a second end, the second beginning being the same as the first beginning, the second end following the first end; determine a time duration from the first end to the second end, the time duration minus a first predetermined duration being equal to a duration difference; and increase the on-time period from a first duration to a second duration based at least in part on the duration difference.

According to another embodiment, a method for regulating a power converter includes: receiving an input signal; generating a drive signal based at least in part on the input signal, the drive signal being associated with an on-time period and an off-time period, the on-time period including a first beginning and a first end; and outputting the drive signal to a switch to close the switch during the on-time period and open the switch during the off-time period to affect a current associated with a secondary winding of the power converter. The generating a drive signal based at least in part on the input signal includes: detecting a demagnetization period associated with the secondary winding based at least in part on the input signal, the demagnetization period including a second beginning and a second end, the second beginning being the same as the first beginning, the second end following the first end; determining a time duration from the first end to the second end, the time duration minus a first predetermined duration being equal to a duration difference; and increasing the on-time period from a first duration to a second duration based at least in part on the duration difference.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

Figure 1:
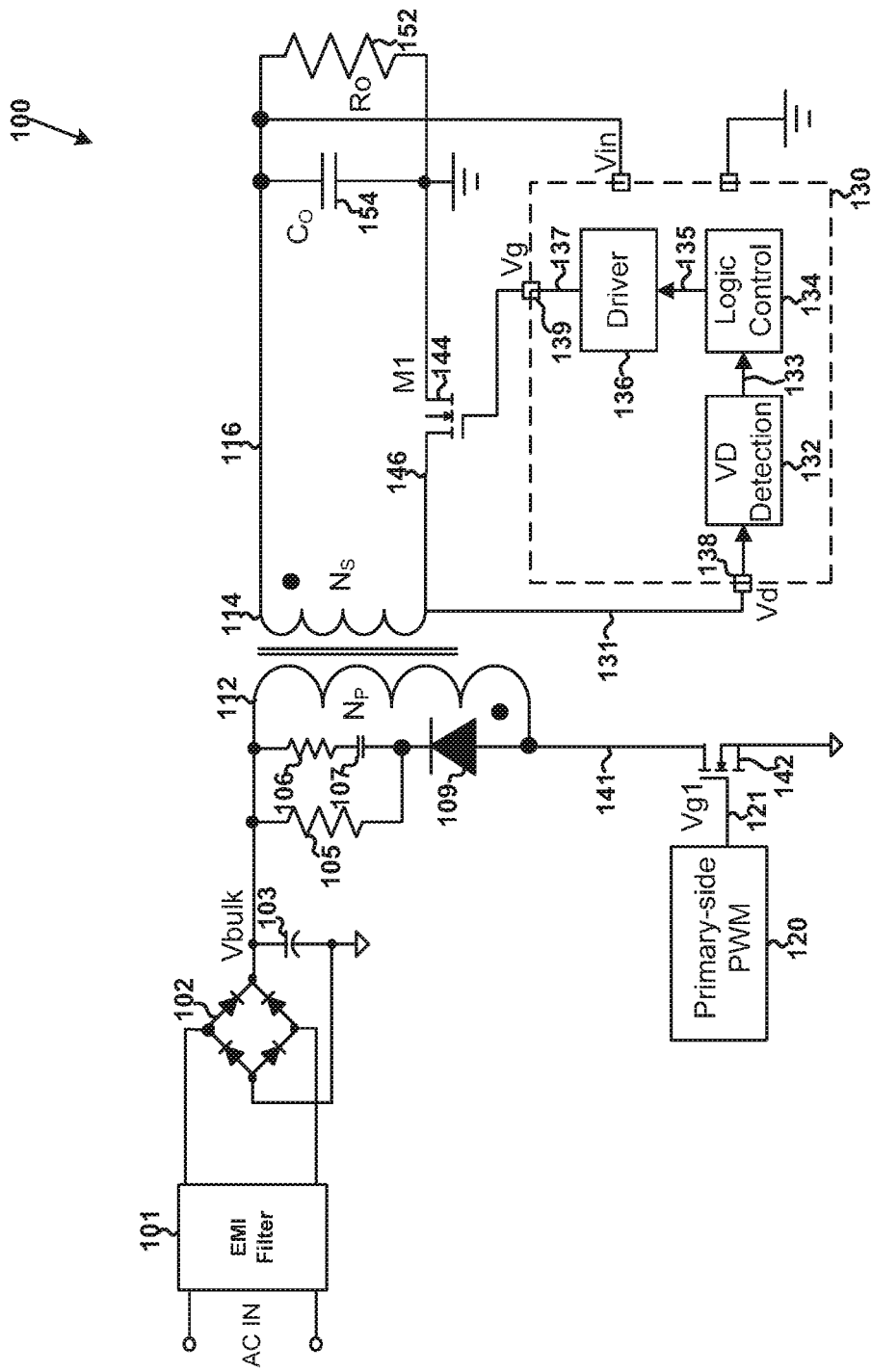
FIG. 1 is a simplified diagram showing a conventional flyback power conversion system with a conventional secondary-side synchronization rectifier (SR) controller.
Figure 2:
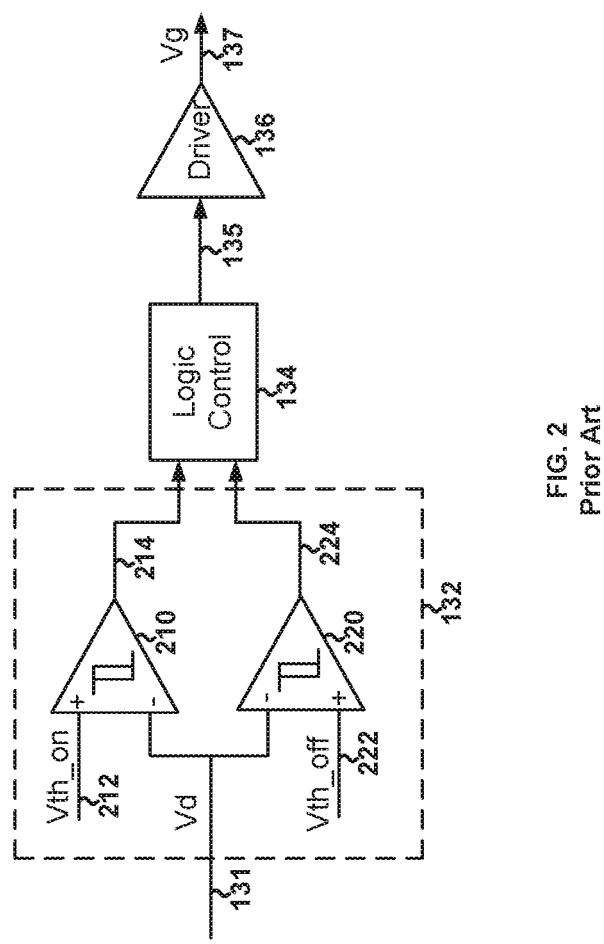
FIG. 2 is a simplified diagram showing certain conventional components of the secondary-side synchronization rectifier controller of the power conversion system as shown in FIG. 1.
Figure 3:
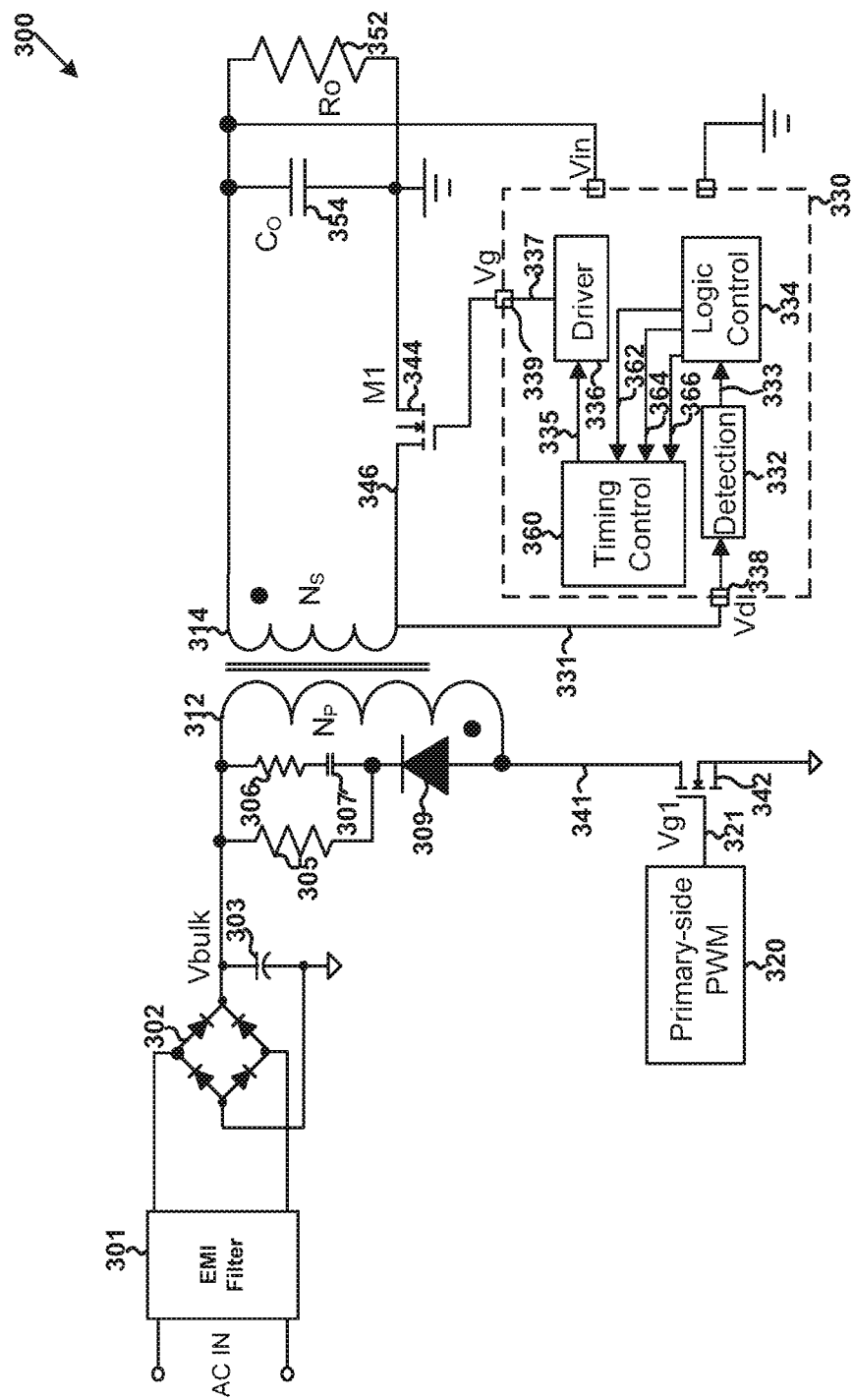
FIG. 3 is a simplified diagram showing a power conversion system with a synchronization rectifier (SR) controller according to an embodiment of the present invention.
Figure 5:
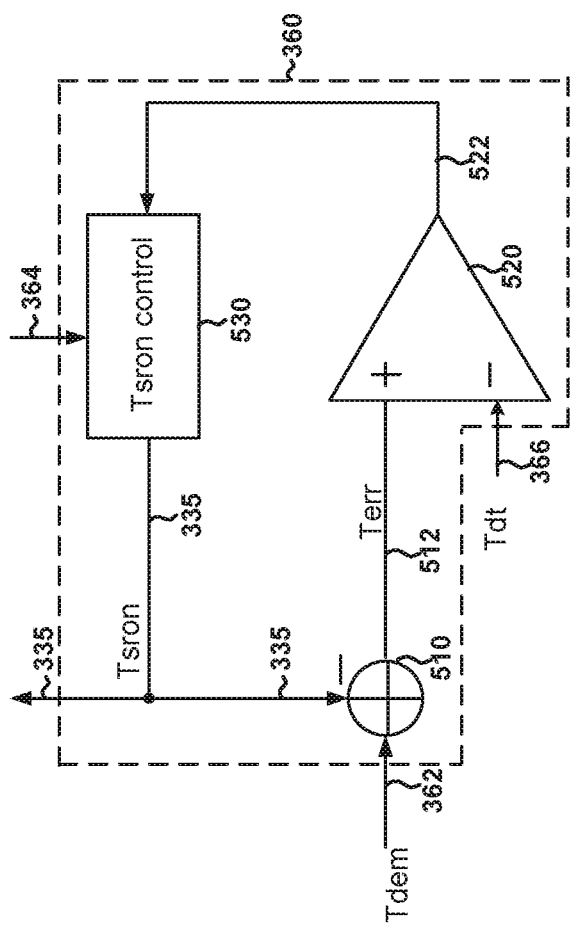
FIG. 5 is a simplified diagram showing certain components of the timing controller as part of the SR controller of the power conversion system as shown in FIG. 3 according to an embodiment of the present invention.
Figure 7:
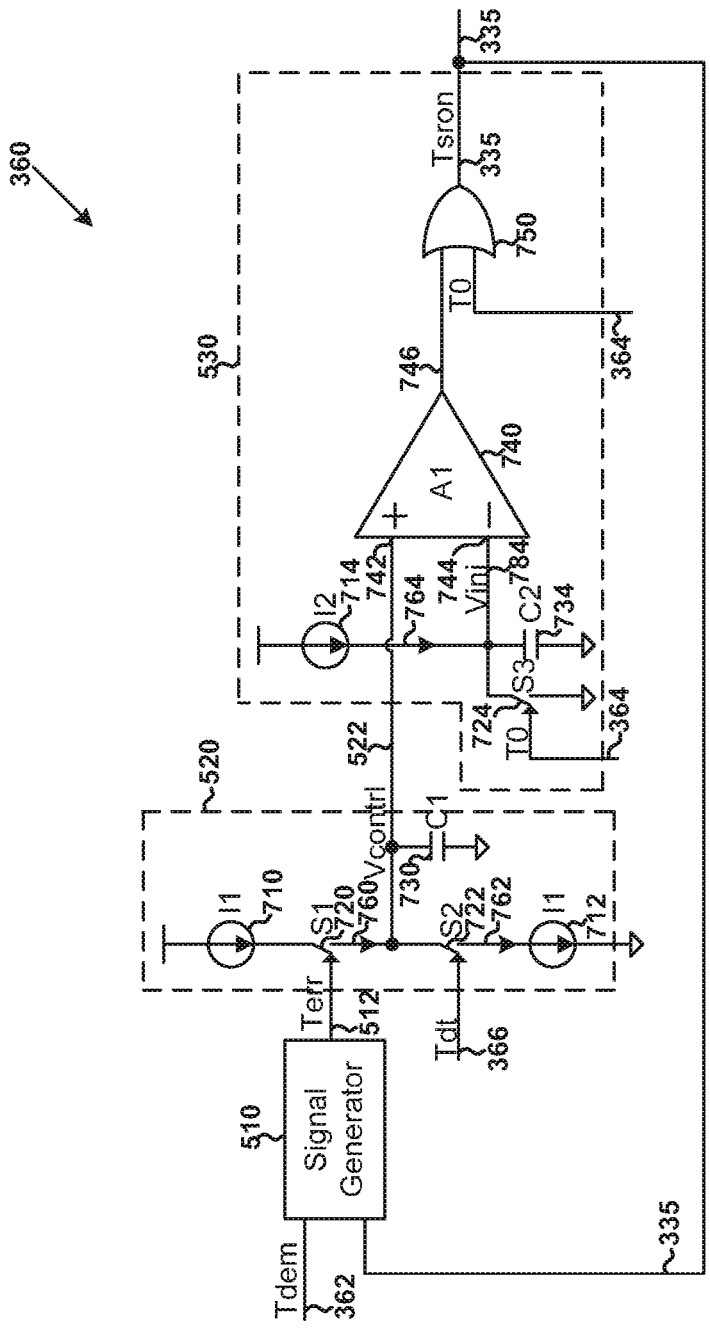
FIG. 7 is a simplified diagram showing certain components of the timing controller as part of the SR controller of the power conversion system as shown in FIG. 3 according to an embodiment of the present invention.
Figure 8:
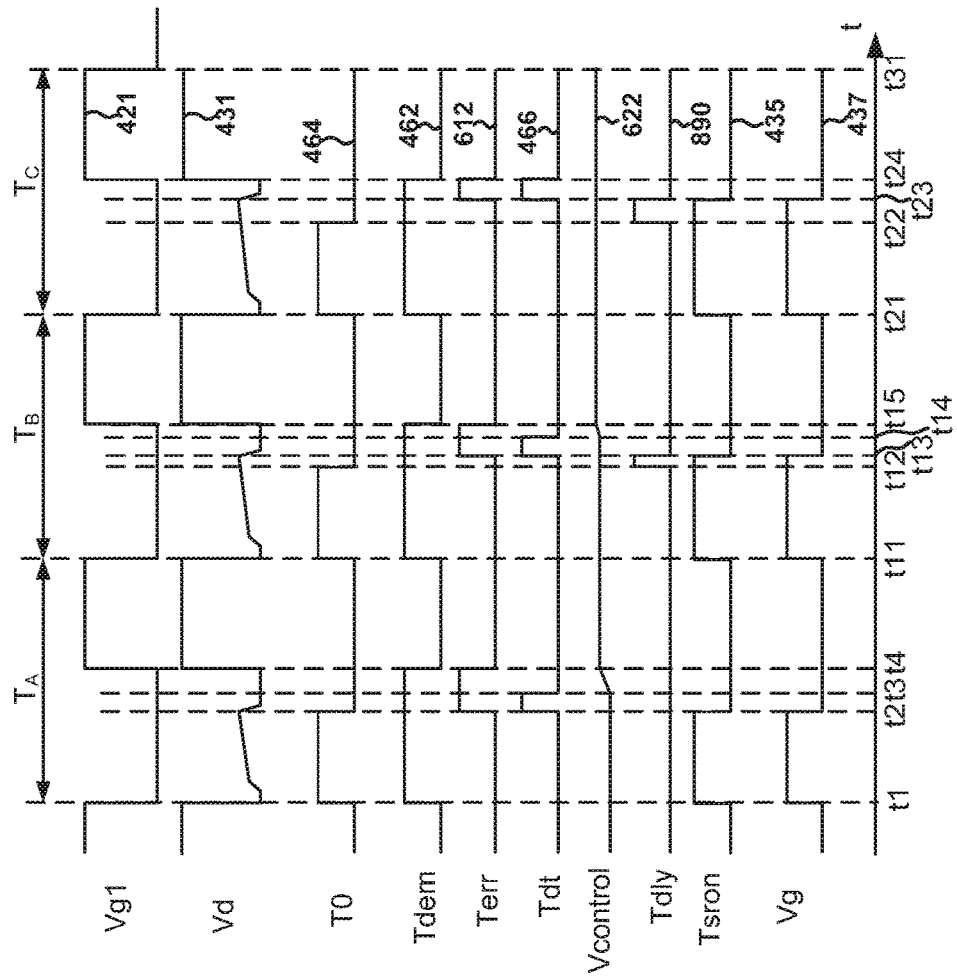

FIG. 8 is a simplified timing diagram for the power conversion system as shown in FIG. 3 that operates under continuous conduction mode (CCM) and the timing controller 360 as part of the power conversion system 300 as shown in FIGS. 3, 5 and 7 according to an embodiment of the present invention.

5. DETAILED DESCRIPTION OF THE INVENTION

Certain embodiments of the present invention are directed to integrated circuits. More particularly, some embodiments of the invention provide systems and methods with timing control for synchronization rectifier controllers. Merely by way of example, some embodiments of the invention have been applied to power converters operating under continuous conduction mode. But it would be recognized that the invention has a much broader range of applicability.

According to certain embodiments, for a flyback power conversion system with a secondary-side synchronization rectifier (SR) controller, under the CCM mode, a secondary-side switch (e.g., a transistor) needs to become open (e.g., turned off) before a primary-side switch (e.g., a transistor) becomes closed (e.g., turned on) to avoid the shoot-through of the transformer and thus to maintain reliability of the flyback power conversion system, but if the secondary-side switch (e.g., a transistor) becomes open (e.g., turned off) too early, the residue current has to flow through the body diode of the secondary-side switch (e.g., a transistor), thus generating more heat and lowering efficiency. According to some embodiments, in order to improve the proper tradeoff between reliability and efficiency, one or more mechanisms for controlling the time period from the time when a secondary-side switch (e.g., a transistor) becoming open (e.g., turned off) to the time when a primary-side switch (e.g., a transistor) becoming closed (e.g., turned on) are provided.

FIG. 3 is a simplified diagram showing a power conversion system with a synchronization rectifier (SR) controller according to an embodiment of the present invention. This diagram is merely an example, which should not unduly limit the scope of the claims. One of ordinary skill in the art would recognize many variations, alternatives, and modifications. The power conversion system 300 (e.g., a power converter) includes an electromagnetic interference (EMI) filter 301, a rectifying bridge 302, capacitors 303 and 307, resistors 305 and 306, a diode 309, a primary winding 312, a secondary winding 314, a pulse-width-modulation (PWM) controller 320 (e.g., a chip), a synchronization rectifier (SR) controller 330 (e.g., a chip), a switch 342 (e.g., a transistor), a switch 344 (e.g., a transistor), an output resistive load 352, and an output capacitive load 354. For example, the pulse-width-modulation (PWM) controller 320 is on the primary side, and the SR controller 330 is on the secondary side. In another example, the switch 342 (e.g., a transistor) is on the primary side, and the switch 344 (e.g., a transistor) is on the secondary side.

In one embodiment, the PWM controller 320 generates a drive signal 321 and outputs the drive signal 321 to the switch 342 (e.g., a transistor). For example, the drive signal 321 is received by the switch 342 (e.g., a transistor) and is used to close or open the switch 342 (e.g., to turn on or off a transistor) to affect a current 341 associated with (e.g., flowing through) the primary winding 312. In another embodiment, the SR controller 330 (e.g., a chip) includes a controller terminal 338 (e.g., a pin) and a controller terminal 339 (e.g., a pin). For example, the SR controller 330 receives, at the controller terminal 338, a signal 331 (e.g., $V_d$) from the drain terminal of the transistor 344 (e.g., a MOSFET transistor), generates a drive signal 337 (e.g., $V_g$), and outputs, at the controller terminal 339, the drive signal 337 to the transistor 344. In another example, the drive signal 337 is received by the gate terminal of the transistor 344 and is used to turn on or off the transistor 344 to affect a current 346 associated with (e.g., flowing through) the secondary winding 314. In yet another embodiment, if the power conversion system 300 operates under the CCM mode, the switch 344 (e.g., a transistor) becomes open (e.g., turned off) before the switch 342 (e.g., a transistor) becomes closed (e.g., turned on), and the switch 344 (e.g., a transistor) remains open (e.g., turned off) when the transistor 342 is closed (e.g., turned on).

As shown in FIG. 3, the SR controller 330 includes a detector 332, a logic controller 334, a gate driver 336, and a timing controller 360 according to certain embodiments. In one embodiment, the detector 332 receives the signal 331 (e.g., $V_d$) from the drain terminal of the transistor 344 and generates a detection signal 333 based at least in part on the signal 331. For example, the signal 331 is the drain voltage of the drain terminal of the transistor 344. In another example, the detection signal 333 represents the detected magnitude of the drain voltage of the drain terminal of the transistor 344 as a function of time.

In another embodiment, the detection signal 333 is received by the logic controller 334, which in response generates a demagnetization signal 362 based at least in part on the detection signal 333. For example, the demagnetization signal 362 represents one or more demagnetization periods of the secondary winding 314. In another example, the logic controller 334 also outputs a logic signal 364, which represents a predetermined initial pulse width (e.g., $T_0$) of the timing signal 335 and a predetermined initial pulse width (e.g., $T_0$) of the drive signal 337. In yet another example, the logic controller 336 also outputs a logic signal 366, which represents a predetermined target duration (e.g., $T_{dt}$) from a time when the switch 344 (e.g., a transistor) becomes open (e.g., turned off) to a time when the switch 342 (e.g., a transistor) becomes closed (e.g., turned on).

In yet another embodiment, the timing controller 360 receives the demagnetization signal 362 and the logic signals 364 and 366, and generates a timing signal 335 based at least in part on the demagnetization signal 362 and the logic signals 364 and 366. In yet another embodiment, the gate driver 336 receives the timing signal 335, generates a drive signal 337 based at least in part on the timing signal 335, and outputs the drive signal 337 (e.g., $V_g$) to the gate terminal of the transistor 344. For example, if the timing signal 335 is at a logic high level, the drive signal also at a logic high level, and if the timing signal 335 is at a logic low level, the drive signal is also at a logic low level. In another example, if the drive signal 337 is at the logic high level, the transistor 344 is turned on, and if the drive signal 337 is at the logic low level, the transistor 344 is turned off.

Figure 4:
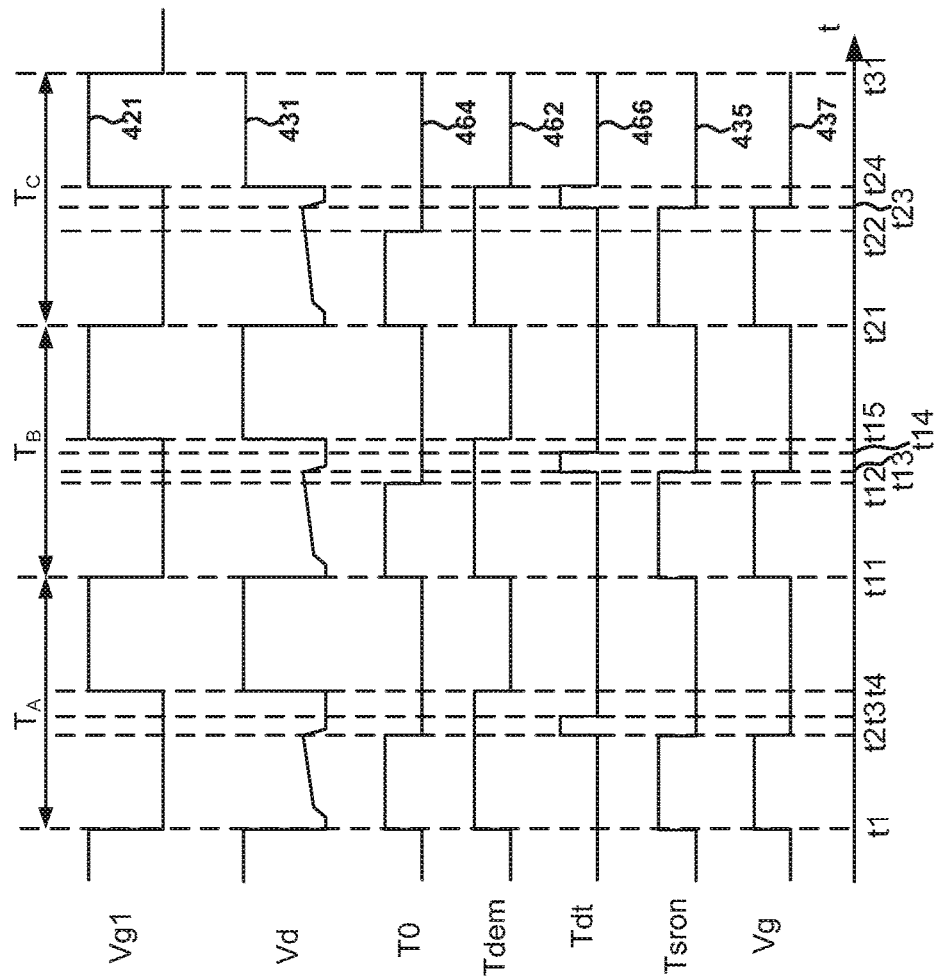
FIG. 4 is a simplified timing diagram for the power conversion system as shown in FIG. 3 that operates wider continuous conduction mode (CCM) according to an embodiment of the present invention.

FIG. 4 is a simplified timing diagram for the power conversion system 300 that operates under continuous conduction mode (CCM) according to an embodiment of the present invention. This diagram is merely an example, which should not unduly limit the scope of the claims. One of ordinary-skill in the art would recognize many variations, alternatives, and modifications. The waveform 421 represents the drive signal 321 as a function of time, the waveform 431 represents the signal 331 as a function of time, the waveform 464 represents the logic signal 364 as a function of time, the waveform 462 represents the demagnetization signal 362 as a function of time, the waveform 466 represents the logic signal 366 as a function of time, the waveform 435 represents the timing signal 335 as a function of time, and the waveform 437 represents the drive signal 337 as a function of time.

According to certain embodiments, the time duration from time $t_1$ to time $t_{11}$ represents a switching cycle of the switch 342 (e.g., a transistor), the time duration from the time $t_{11}$ to time $t_{21}$ represents a switching cycle of the switch 342 (e.g., a transistor), and the time duration from the time $t_{21}$ to time $t_{31}$ represents a switching cycle of the switch 342 (e.g., a transistor). For example, the time duration from time $t_1$ to time $t_{11}$ is represented by a switching cycle $T_A$. In another example, the time duration from the time $t_{11}$ to time $t_{21}$ is represented by a switching cycle $T_B$. In yet another example, the rime duration from the time $t_{21}$ to time $t_{31}$ is represented by a switching cycle $T_C$. In yet another example, the switching cycle $T_A$, the switching cycle $T_B$, and the switching cycle $T_C$ are equal in duration.

In one embodiment, at the time $t_1$, the drive signal 321 changes from the logic high level to the logic low level (e.g., as shown by the waveform 421), and the switch 342 (e.g., a transistor) becomes open (e.g., turned off). In another embodiment, at the time $t_1$, the signal 331 starts decreasing rapidly (e.g., as shown by the waveform 431). For example, at the time $t_1$, the demagnetization signal 362 changes from the logic low level to the logic high level (e.g., as shown by the waveform 462), indicating the beginning of a demagnetization period. In another example, at the time $t_1$, the logic signal 364 changes from the logic low level to the logic high level (e.g., as shown by the waveform 464), indicating the beginning of a time period that represents a predetermined initial pulse width (e.g., $T_0$) of the timing signal 335 and a predetermined initial pulse width (e.g., $T_0$) of the drive signal 337. In yet another embodiment, at the time $t_1$, the timing signal 335 changes from the logic low level to the logic high level (e.g., as shown by the waveform 435), indicating the beginning of a pulse width of the timing signal 335. For example, at the time $t_1$, the drive signal 337 changes from the logic low level to the logic high level (e.g., as shown by the waveform 437), indicating the beginning of a pulse width of the drive signal 337. In another example, at the time $t_1$, the switch 344 (e.g., a transistor) becomes closed (e.g., turned on), indicating the beginning of an on-time period that is the same as the pulse width of the drive signal 337.

According to one embodiment, at time $t_2$, the logic signal 364 changes from the logic high level to the logic low level (e.g., as shown by the waveform 464), indicating the end of the time period that represents the predetermined initial pulse width (e.g., $T_0$) of the timing signal 335 and the predetermined initial pulse width (e.g., $T_0$) of the drive signal 337. For example, at the time $t_2$, the timing signal 335 changes from the logic high level to the logic low level (e.g., as shown by the waveform 435), indicating the end of the pulse width of the timing signal 335 that is initially equal to the predetermined initial pulse width (e.g., $T_0$) of the timing signal 335. In another example, at the time $t_2$, the drive signal 337 changes from the logic high level to the logic low level (e.g., as shown by the waveform 437), indicating the end of the pulse width of the drive signal 337 that is initially equal to the predetermined initial pulse width (e.g., $T_0$) of the drive signal 337. In yet another example, al the time $t_2$, the logic signal 366 changes from the logic low level to the logic high level (e.g., as shown by the waveform 466), indicating the beginning of a time period that represents a predetermined target duration (e.g., $T_{dt}$) from the time when the switch 344 (e.g., a transistor) becomes open (e.g., turned off) to the time when the switch 342 (e.g., a transistor) becomes closed (e.g., turned on).

In one embodiment, at time $t_3$, the logic signal 366 changes from the logic high level to the logic low level (e.g., as shown by the waveform 466), indicating the end of the time period that represents the predetermined target duration (e.g., $T_{dt}$) from the time when the switch 344 (e.g., a transistor) becomes open (e.g., turned off) to the time when the switch 342 (e.g., a transistor) becomes closed (e.g., turned on).

According to one embodiment, at time $t_4$, the drive signal 321 changes from the logic low level to the logic high level (e.g., as shown by the waveform 421), and the switch 342 (e.g., a transistor) becomes closed (e.g., turned on). According to another embodiment, at the time $t_4$, the signal 331 starts increasing rapidly (e.g., as shown by the waveform 431). For example, at the time $t_4$, the demagnetization signal 362 changes from the logic high level to the logic low level (e.g., as shown by the waveform 462), indicating the end of the demagnetization period. In another example, the time $t_4$ is after the time $t_3$, and the actual duration from the time the time $t_2$) when the switch 344 (e.g., a transistor) becomes open (e.g., turned off) to the time (e.g., the time $t_4$) when the switch 342 (e.g., a transistor) becomes closed (e.g., turned on) exceeds the predetermined target duration (e.g., $T_{dt}$), which for example is from the time $t_2$ to the time $t_3$.

In one embodiment, at the time $t_{11}$, the drive signal 321 changes from the logic high level to the logic low level (e.g., as shown by the waveform 421), and the switch 342 (e.g., a transistor) becomes open (e.g., turned off). In another embodiment, at the time $t_{11}$, the signal 331 starts decreasing rapidly (e.g., as shown by the waveform 431). For example, at the time $t_{11}$, the demagnetization signal 362 changes from the logic low level to the logic high level (e.g., as shown by the waveform 462), indicating the beginning of a demagnetization period. In another example, at the time $t_{11}$, the logic signal 364 changes from the logic low level to the logic high level (e.g., as shown by the waveform 464), indicating the beginning of a time period that represents the predetermined initial pulse width (e.g., $T_0$) of the timing signal 335 and the predetermined initial pulse width (e.g., $T_0$) of the drive signal 337. In yet another embodiment, at the time $t_{11}$, the timing signal 335 changes from the logic low level to the logic high level (e.g., as shown by the waveform 435), indicating the beginning of a pulse width of the timing signal 335. For example, at the time the drive signal 337 changes from the logic low level to the logic high level (e.g., as shown by the waveform 437), indicating the beginning of a pulse width of the drive signal 337. In another example, at the time $t_{11}$, the switch 344 (e.g., a transistor) becomes closed (e.g., turned on), indicating the beginning of an on-time period that is the same as the pulse width of the drive signal 337.

According to one embodiment, at time $t_{12}$, the logic signal 364 changes from the logic high level to the logic low level (e.g., as shown by the waveform 464), indicating the end of the time period that represents the predetermined initial pulse width (e.g., $T_0$) of the timing signal 335 and the predetermined initial pulse width (e.g., $T_0$) of the drive signal 337.

In one embodiment, at time $t_{13}$, the timing signal 335 changes from the logic high level to the logic low level (e.g., as shown by the waveform 435), indicating the end of the pulse width of the timing signal 335. For example, the time $t_{13}$ is after the time $t_{12}$, and the actual pulse width of the timing signal 335 (e.g., from the time $t_{11}$ to the time $t_{13}$) exceeds the predetermined initial pulse width (e.g., $T_0$) of the timing signal 335 (e.g., from the time $t_{11}$ to the time $t_{12}$). In another embodiment, at the time $t_{13}$, the drive signal 337 changes from the logic high level to the logic low level (e.g., as shown by the waveform 437), indicating the end of the pulse width of the drive signal 337. For example, the time $t_{13}$ is after the time $t_{12}$, and the actual pulse width of the drive signal 337 (e.g., from the time $t_{11}$ to the time $t_{13}$) exceeds the predetermined initial pulse width (e.g., $T_0$) of the drive signal 337 (e.g., from the time $t_{11}$ to the time $t_{12}$), In yet another embodiment, at the time $t_{13}$, the logic signal 366 changes from the logic low level to the logic high level (e.g., as shown by the waveform 466), indicating the beginning of a time period that represents a predetermined target duration (e.g., $T_{dt}$) from the time when the switch 344 (e.g., a transistor) becomes open (e.g., turned off) to the time when the switch 342 (e.g., a transistor) becomes closed (e.g., turned on).

According to one embodiment, at time $t_{14}$, the logic signal 366 changes from the logic high level to the logic low level (e.g., as shown by the waveform 466), indicating the end of the time period that represents the predetermined target duration (e.g., $T_{dt}$) from the time when the switch 344 (e.g., a transistor) becomes open (e.g., turned off) to the time when the switch 342 (e.g., a transistor) becomes closed (e.g., turned on).

In one embodiment, at time $t_{15}$, the drive signal 321 changes from the logic low level to the logic high level (e.g., as shown by the waveform 421), and the switch 342 (e.g., a transistor) becomes closed (e.g., turned on). In another embodiment, at the time $t_{15}$, the signal 331 starts increasing rapidly (e.g., as shown by the waveform 431). For example, at the time $t_{15}$, the demagnetization signal 362 changes from the logic high level to the logic low level (e.g., as shown by the waveform 462), indicating the end of the demagnetization period. In another example, the time $t_{15}$ is after the time $t_{14}$, and the actual duration from the time (e.g., the time $t_{13}$) when the switch 344 (e.g., a transistor) becomes open (e.g., turned off) to the time (e.g., the time $t_{15}$) when the switch 342 (e.g., a transistor) becomes closed (e.g., turned on) exceeds the predetermined target duration (e.g., $T_{dt}$), which for example is from the time $t_{13}$ to the time $t_{14}$.

According to one embodiment, at the time $t_{21}$, the drive signal 321 changes from the logic high level to the logic low level (e.g., as shown by the waveform 421), and the switch 342 (e.g., a transistor) becomes open (e.g., turned off). According to another embodiment, at the time $t_{21}$, the signal 331 starts decreasing rapidly (e.g., as shown by the waveform 431). For example, at the time $t_{21}$, the demagnetization signal 362 changes from the logic low level to the logic high level (e.g., as shown by the waveform 462), indicating the beginning of a demagnetization period. In another example, at the time $t_{21}$, the logic signal 364 changes from the logic low level to the logic high level (e.g., as shown by the waveform 464), indicating the beginning of a time period that represents the predetermined initial pulse width (e.g., $T_0$) of the timing signal 335 and the predetermined initial pulse width (e.g., $T_0$) of the drive signal 337. According to yet another embodiment, at the time $t_{21}$, the timing signal 335 changes from the logic low level to the logic high level (e.g., as shown by the waveform 435), indicating the beginning of a pulse width of the timing signal 335. For example, at the time $t_{21}$, the drive signal 337 changes from the logic low level to the logic high level (e.g., as shown by the waveform 437), indicating the beginning of a pulse width of the drive signal 337. In another example, at the time $t_{21}$, the switch 344 (e.g., a transistor) becomes closed (e.g., turned on), indicating the beginning of an on-time period that is the same as the pulse width of the drive signal 337.

In one embodiment, at time $t_{22}$, the logic signal 364 changes from the logic high level to the logic low level (e.g., as shown by the waveform 464), indicating the end of the time period that represents the predetermined initial pulse width (e.g., $T_0$) of the timing signal 335 and the predetermined initial pulse width (e.g., $T_0$) of the drive signal 337.

According to one embodiment, at time $t_{23}$, the timing signal 335 changes from the logic high level to the logic low level (e.g., as shown by the waveform 435), indicating the end of the pulse width of the timing signal 335. For example, the time $t_{23}$ is after the time $t_{22}$, and the actual pulse width of the timing signal 335 (e.g., from the time $t_{21}$ to the time $t_{23}$) exceeds the predetermined initial pulse width (e.g., $T_0$) of the timing signal 335 (e.g., from the time $t_{21}$ to the time $t_{22}$). In another embodiment, at the time $t_{23}$, the drive signal 337 changes from the logic high level to the logic low level (e.g., as shown by the waveform 437), indicating the end of the pulse width of the drive signal 337. For example, the time $t_{23}$ is after the time $t_{22}$, and the actual pulse width of the drive signal 337 (e.g., from the time $t_{21}$ to the time $t_{23}$) exceeds the predetermined initial pulse width (e.g., $T_0$) of the drive signal 337 (e.g., from the time $t_{21}$ to the time $t_{22}$). In yet another embodiment, at the time $t_{23}$, the logic signal 366 changes from the logic low level to the logic high level (e.g., as shown by the waveform 466), indicating the beginning of a time period that represents a predetermined target duration (e.g., $T_{dt}$) from the time when the switch 344 (e.g., a transistor) becomes open (e.g., turned off) to the time when the switch 342 (e.g., a transistor) becomes closed (e.g., turned on).

In one embodiment, at time $t_{24}$, the drive signal 321 changes from the logic low level to the logic high level (e.g., as shown by the waveform 421), and the switch 342 (e.g., a transistor) becomes closed (e.g., turned on). For example, at the time $t_{24}$, the signal 331 starts increasing rapidly (e.g., as shown by the waveform 431). In another example, at the time $t_{24}$, the demagnetization signal 362 changes from the logic high level to the logic low level (e.g., as shown by the waveform 462), indicating the end of the demagnetization period. In another embodiment, at the time $t_{24}$, the logic signal 366 changes from the logic high level to the logic low level (e.g., as shown by the waveform 466), indicating the end of the time period that represents the predetermined target duration (e.g., $T_{dt}$) from the time when the switch 344 (e.g., a transistor) becomes open (e.g., turned off) to the time when the switch 342 (e.g., a transistor) becomes closed (e.g., turned on). For example, the actual duration from the time (e.g., the time $t_{23}$) when the switch 344 (e.g., a transistor) becomes open (e.g., turned off) to the time (e.g., the time $t_{24}$) when the switch 342 (e.g., a transistor) becomes closed (e.g., turned on) is equal to the predetermined target duration $T_{dt}$), which for example is from the time $t_{23}$ to the time $t_{24}$.

According to one embodiment, at the time $t_{31}$, the drive signal 321 changes from the logic high level to the logic low level (e.g., as shown by the waveform 421), and the switch 342 (e.g., a transistor) becomes open (e.g., turned off).

According to another embodiment, at the time $t_{31}$, the signal 331 starts decreasing rapidly (e.g., as shown by the waveform 431). For example, at the time $t_{31}$, the demagnetization signal 362 changes from the logic low level to the logic high level (e.g., as shown by the waveform 462), indicating the beginning of a demagnetization period. In another example, at the time $t_{31}$, the logic signal 364 changes from the logic low level to the logic high level (e.g., as shown by the waveform 464), indicating the beginning of a time period that represents the predetermined initial pulse width (e.g., $T_0$) of the timing signal 335 and the predetermined initial pulse width (e.g., $T_0$) of the drive signal 337. According to yet another embodiment, at the time $t_{31}$, the timing signal 335 changes from the logic low level to the logic high level (e.g., as shown by the waveform 435), indicating the beginning of a pulse width of the timing signal 335. For example, at the time $t_{31}$, the drive signal 337 changes from the logic low level to the logic high level (e.g., as shown by the waveform 437), indicating the beginning of a pulse width of the drive signal 337. In another example, at the time $t_{31}$, the switch 344 (e.g., a transistor) becomes closed (e.g., turned on), indicating the beginning of an on-time period that is the same as the pulse width of the drive signal 337.

According to certain embodiments, as shown by the waveform 464, the time duration from the time $t_1$ to the time $t_2$, the time duration from the time $t_{11}$ to the time $t_{12}$, and the time duration from the time $t_{21}$ to the time $t_{22}$ are equal, each of which represents the predetermined initial pulse width (e.g., $T_0$) of the timing signal 335 and the predetermined initial pulse width (e.g., $T_0$) of the drive signal 337. For example, the actual pulse width of the timing signal 335 from the time $t_1$ to the time $t_2$ is equal to the predetermined initial pulse width (e.g., $T_0$) of the timing signal 335, the actual pulse width of the timing signal 335 from the time $t_{11}$ to the time $t_{13}$ exceeds the predetermined initial pulse width (e.g., $T_0$) of the timing signal 335 from the time $t_{11}$ to the time $t_{12}$, and the actual pulse width of the timing signal 335 from the time $t_{21}$ to the time $t_{23}$ exceeds the predetermined initial pulse width (e.g., $T_0$) of the timing signal 335 from the time $t_{21}$ to the time $t_{22}$. In another example, the actual pulse width of the timing signal 335 from the time $t_1$ to the time $t_2$ is smaller than the actual pulse width of the tinting signal 335 from the time $t_{11}$ to the time $t_{13}$, and the actual pulse width of the timing signal 335 from the time $t_{11}$ to the time $t_{13}$ is smaller than the actual pulse width of the timing signal 335 from the time $t_{21}$ to the time $t_{23}$.

According to some embodiments, as shown by the waveform 466, the time duration from the time $t_2$ to the time $t_3$, the time duration from the time $t_{13}$ to the time $t_{14}$, and the time duration from the time $t_{23}$ to the time $t_{24}$ are equal, each of which represents the predetermined target duration (e.g., $T_{dt}$) from the time when the switch 344 (e.g., a transistor) becomes open (e.g., turned off) to the time when the switch 342 (e.g., a transistor) becomes closed (e.g., turned on). For example, the actual duration from the time $t_2$ when the switch 344 (e.g., a transistor) becomes open (e.g., turned off) to the time $t_4$ when the switch 342 (e.g., a transistor) becomes closed (e.g., turned on) exceeds the predetermined target duration $T_{dt}$ (e.g., from the time $t_2$ to the time $t_3$), the actual duration from the time $t_{13}$ when the switch 344 (e.g., a transistor) becomes open (e.g., turned off) to the time $t_{15}$ when the switch 342 (e.g., a transistor) becomes closed (e.g., turned on) exceeds the predetermined target duration $T_{dt}$ (e.g., from the time $t_{13}$ to the time $t_{14}$), and the actual duration from the time $t_{23}$ when the switch 344 (e.g., a transistor) becomes open (e.g., turned off) to the time $t_{24}$ when the switch 342 (e.g., a transistor) becomes closed (e.g., turned on) is equal to the predetermined target duration $T_{dt}$ (e.g., from the time $t_{23}$ to the time $t_{24}$). For example, the actual duration from the time $t_2$ when the switch 344 (e.g., a transistor) becomes open (e.g., turned off) to the time $t_4$ when the switch 342 (e.g., a transistor) becomes closed (e.g., turned on) is larger than the actual duration from the time $t_{13}$ when the switch 344 (e.g., a transistor) becomes open (e.g., turned off) to the time $t_{15}$ when the switch 342 (e.g., a transistor) becomes closed (e.g., turned on). In another example, the actual duration from the time $t_{13}$ when the switch 344 (e.g., a transistor) becomes open (e.g., turned off) to the time $t_{15}$ when the switch 342 (e.g., a transistor) becomes closed (e.g., turned on) is larger than the actual duration from the time $t_{23}$ when the switch 344 (e.g., a transistor) becomes open (e.g., turned off) to the time $t_{24}$ when the switch 342 (e.g., a transistor) becomes closed (e.g., turned on).

As shown in FIG. 4, from the switching cycle $T_A$ to the switching cycle $T_B$, the actual pulse width of the timing signal 335 increases from the predetermined initial pulse width (e.g., $T_0$) of the timing signal 335 to a larger value, and from the switching cycle $T_B$ to the switching cycle $T_C$, the actual pulse width of the timing signal 335 further increases to an even larger value, according to one embodiment. From the switching cycle $T_A$ to the switching cycle $T_B$, the actual pulse width of the drive signal 337 increases from the predetermined initial pulse width (e.g., $T_0$) of the drive signal 337 to a larger value, and from the switching cycle $T_B$ to the switching cycle $T_C$, the actual pulse width of the drive signal 337 further increases to an even larger value, according to another embodiment. Also, as shown in FIG. 4, from the switching cycle $T_A$ to the switching cycle $T_B$, the actual duration from the time When the switch 344 (e.g., a transistor) becomes open (e.g., turned off) to the time when the switch 342 (e.g., a transistor) becomes closed (e.g., turned on) decreases, and from the switching cycle $T_B$ to the switching cycle $T_C$, the actual duration from the time when the switch 344 (e.g., a transistor) becomes open (e.g., turned off) to the time when the switch 342 (e.g., a transistor) becomes closed (e.g., turned on) further decreases to the predetermined target duration (e.g., $T_{dt}$).

For example, in switching cycles after the switching cycle $T_C$, the actual pulse width of the timing signal 335 does not change and remains equal to the actual pulse width of the timing signal 335 in the switching cycle $T_C$. In another example, in switching cycles after the switching cycle $T_C$, the actual pulse width of the drive signal 337 does not change and remains equal to the actual pulse width of the drive signal 337 in the switching cycle $T_C$. In yet another example, in switching cycles after the switching cycle $T_C$, the actual duration from the time when the switch 344 (e.g., a transistor) becomes open (e.g., turned off) to the time when the switch 342 (e.g., a transistor) becomes closed (e.g., turned on) does not change and remains equal to the predetermined target duration ($T_{dt}$).

According to certain embodiments, the duration from a time when the switch 344 (e.g., a transistor) becomes open (e.g., turned off) to a time when the switch 342 (e.g., a transistor) becomes closed (e.g., turned on) is represented by a dead time, during which both the switch 342 (e.g., a transistor) and the switch 344 (e.g., a transistor) are open turned off). According to some embodiments, the power conversion system 300 uses an adaptive method to gradually shorten the dead time from a time when the switch 344 (e.g., a transistor) on the secondary side becomes open (e.g., turned off) to a time when the switch 342 (e.g., a transistor) on the primary side becomes closed (e.g., turned on).

As discussed above and further emphasized here, FIG. 4 is merely an example, which should not unduly limit the scope of the claims. One of ordinary skill in the art would recognize many variations, alternatives, and modifications. For example, from the switching cycle $T_A$ when the actual pulse width of the timing signal 335 is equal to the predetermined initial pulse width (e.g., $T_0$) of the timing signal 335 and when the actual pulse width of the drive signal 337 is equal to the predetermined initial pulse width (e.g., $T_0$) of the drive signal 337 to another switching cycle $T_C$ when the actual duration from the time when the switch 344 (e.g., a transistor) becomes open (e.g., turned off) to the time when the switch 342 (e.g., a transistor) becomes closed (e.g., turned on) becomes equal to the predetermined target duration ($T_{dt}$), there is more than one switching cycle (e.g., including the switching cycle $T_B$ and one or more other switching cycles). In another example, from the switching cycle $T_A$ when the actual pulse width of the timing signal 335 is equal to the predetermined initial pulse width (e.g., $T_0$) of the timing signal 335 and when the actual pulse width of the drive signal 337 is equal to the predetermined initial pulse width (e.g., $T_0$) of the drive signal 337 to another switching cycle $T_C$ when the actual duration from the time when the switch 344 (e.g., a transistor) becomes open (e.g., turned off) to the time When the switch 342 (e.g., a transistor) becomes closed (e.g., turned on) becomes equal to the predetermined target duration ($T_{dt}$), there is no other switching cycle, and the switching cycle $T_C$ follows immediately the switching cycle $T_A$.

FIG. 5 is a simplified diagram showing certain components of the timing controller 360 as part of the SR controller 330 of the power conversion system 300 according to an embodiment of the present invention. This diagram is merely an example, which should not unduly limit the scope of the claims. One of ordinary skill in the art would recognize many variations, alternatives, and modifications. The timing controller 360 includes a pulse-signal generator 510, a voltage-signal generator 520, and a timing-signal generator 530.

In one embodiment, the pulse-signal generator 510 receives the demagnetization signal 362 and the timing signal 335 and generates a pulse signal 512 based at least in part on the demagnetization signal 362 and the timing signal 335. For example, the timing signal 335 indicates a time when the switch 344 (e.g., a transistor) becomes open (e.g., turned off), and the demagnetization signal 362 indicates a time when the switch 342 (e.g., a transistor) becomes closed (e.g., turned on). In another example, the pulse signal 512 includes one or more pulses, and each of the one or more pulses corresponds to a pulse width that represents an actual duration (e.g., $T_{err}$) from the time when the switch 344 (e.g., a transistor) becomes open (e.g., turned off) to the time when the switch 342 (e.g., a transistor) becomes closed (e.g., turned on).

In another embodiment, the control-voltage generator 520 receives the pulse signal 512 and the logic signal 366 and generates a voltage signal 522 based at least in part on the pulse signal 512 and the logic signal 366. For example, the logic signal 366 includes one or more pulses, and each of the one or more pulses corresponds to a pulse width that represents a predetermined target duration (e.g., $T_{dt}$). In another example, the difference in pulse width between the pulse signal 512 and the logic signal 366 represents the difference between the actual duration (e.g., $T_{err}$) and the predetermined target duration (e.g., $T_{dt}$). In yet another example, the voltage signal 522 is generated based at least in part on the difference in pulse width between the pulse signal 512 and the logic signal 366.

In yet another embodiment, the timing-signal generator 530 receives the voltage signal 522 and the logic signal 364, generates the timing signal 335 based at least in part on the voltage signal 522 and the logic signal 364, and outputs the timing signal 335 to the pulse-signal generator 510 and the gate driver 336. For example, the logic signal 364 includes one or more pulses, and each of the one or more pulses corresponds to a pulse width that represents a predetermined initial pulse width (e.g., $T_0$) of the timing signal 335. In another example, the timing signal 335 includes an initial pulse, and the initial pulse corresponds to a pulse width that is equal to the predetermined initial pulse width (e.g., $T_0$).

Figure 6:
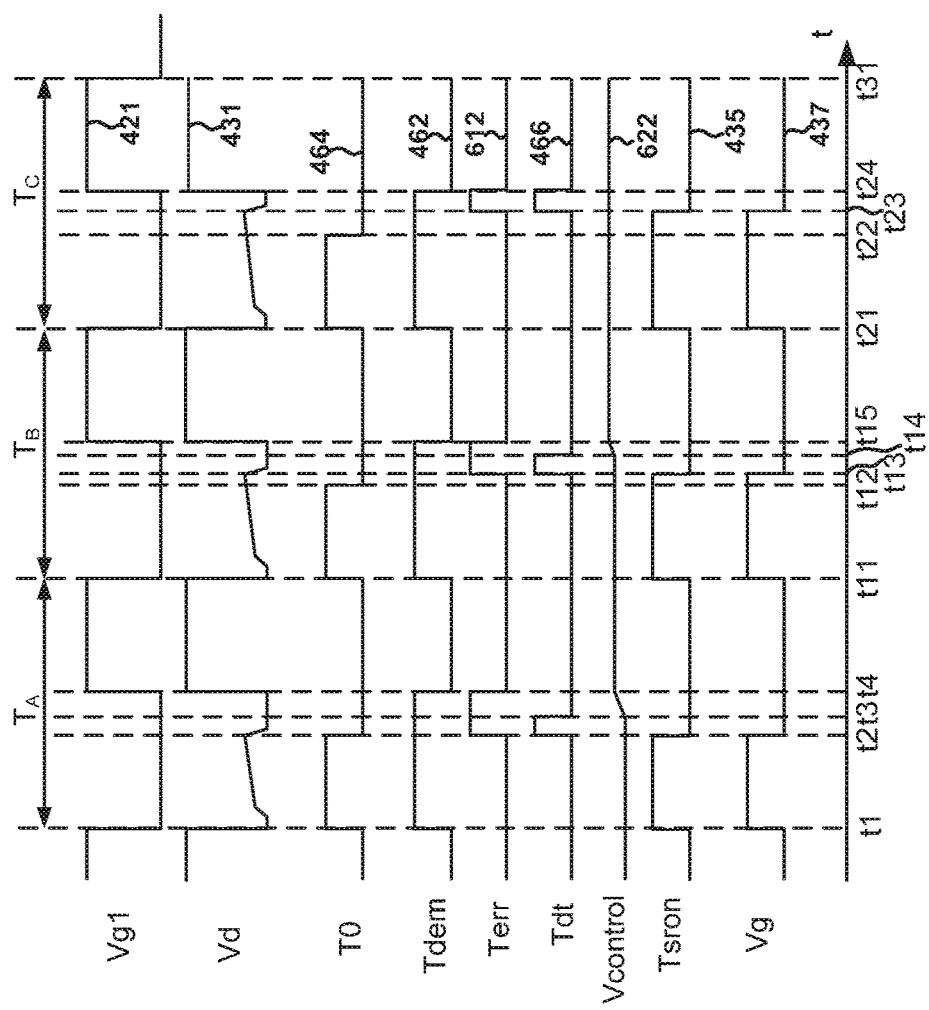
FIG. 6 is a simplified timing diagram for the power conversion system as shown in FIG. 3 that operates under continuous conduction mode (CCM) and the timing controller as part of the power conversion system as shown in FIGS. 3 and 5 according to an embodiment of the present invention.

FIG. 6 is a simplified timing diagram for the power conversion system 300 that operates under continuous conduction mode (CCM) and the timing controller 360 as part of the power conversion system 300 as shown in FIGS. 3 and 5 according to an embodiment of the present invention. This diagram is merely an example, which should not unduly limit the scope of the claims. One of ordinary skill in the art would recognize many variations, alternatives, and modifications.

According to certain embodiments, the simplified timing diagram includes the waveforms 421, 431, 464, 462, 466, 435 and 437 as shown in FIG. 4 and further includes waveforms 612 and 622. As shown in FIGS. 4 and 6, the waveform 421 represents the drive signal 321 as a function of time, the waveform 431 represents the signal 331 as a function of time, the waveform 464 represents the logic signal 364 as a function of time, the waveform 462 represents the demagnetization signal 362 as a function of time, the waveform 466 represents the logic signal 366 as a function of time, the waveform 435 represents the timing signal 335 as a function of time, and the waveform 437 represents the drive signal 337 as a function of time. As shown in FIG. 6, the waveform 612 represents the pulse signal 512 as a function of time, and the waveform 622 represents the voltage signal 522 as a function of time.

In one embodiment, at the time $t_2$, the timing signal 335 changes from the logic high level to the logic low level (e.g., as shown by the waveform 435), indicating the end of the pulse width of the timing signal 335 that is equal to the predetermined initial pulse width (e.g., $T_0$) of the timing signal 335 during the switching cycle $T_A$, and also indicating a time when the switch 344 (e.g., a transistor) becomes open (e.g., turned off). For example, at the time $t_2$, the pulse signal 512 changes from the logic low level to the logic high level (e.g., as shown by the waveform 612), indicating the beginning of a time period that represents an actual duration (e.g., $T_{err}$) from a time when the switch 344 (e.g., a transistor) becomes open (e.g., turned off) to a time when the switch 342 (e.g., a transistor) becomes closed (e.g., turned on). In another example, the time $t_2$ indicates the beginning of an actual dead time $T_{err}$. In yet another example, at the time $t_2$, the logic signal 366 changes from the logic low level to the logic high level (e.g., as shown by the waveform 466), indicating the beginning of a time period that represents a predetermined target duration (e.g., $T_{dt}$) from a time when the switch 344 (e.g., a transistor) becomes open (e.g., turned off) to a time when the switch 342 (e.g., a transistor) becomes closed (e.g., turned on). In yet another example, the time $t_2$ indicates the beginning of a predetermined target dead time $T_{dt}$.

According to one embodiment, at the time $t_3$, the logic signal 366 changes from the logic high level to the logic low level (e.g., as shown by the waveform 466), indicating the end of the time period that represents the predetermined target duration (e.g., $T_{dt}$) from the time when the switch 344 (e.g., a transistor) becomes open (e.g., turned off) to the time when the switch 342 (e.g., a transistor) becomes closed (e.g., turned on). For example, the time $t_3$ indicates the end of the predetermined target dead time $T_{dt}$. In another example, at the time $t_3$, the voltage signal 522 starts to increase from a voltage magnitude $V_1$. In yet another example, from the time $t_1$ to the time $t_3$, the voltage signal 522 remains constant at the voltage magnitude $V_1$.

In one embodiment, at the time $t_4$, the demagnetization signal 362 changes from the logic high level to the logic low level (e.g., as shown by the waveform 462), indicating the end of the demagnetization period and also indicating the time when the switch 342 (e.g., a transistor) becomes closed (e.g., turned on). For example, at the time $t_4$, the pulse signal 512 changes from the logic high level to the logic low level (e.g., as shown by the waveform 612), indicating the end of the time period that represents the actual duration (e.g., $T_{err}$) from the time when the switch 344 (e.g., a transistor) becomes open (e.g., turned off) to the time when the switch 342 (e.g., a transistor) becomes closed (e.g., turned on). In another example, the time $t_4$ indicates the end of the actual dead time $T_{err}$. In yet another example, at the time $t_4$, the voltage signal 522 increases to a voltage magnitude $V_2$. In yet another example, from the time $t_4$ to the time $t_{14}$, the voltage signal 522 remains constant at the voltage magnitude $V_2$.

According to one embodiment, at the time $t_{13}$, the timing signal 335 changes from the logic high level to the logic low level (e.g., as shown by the waveform 435), indicating the end of the pulse width of the timing signal 335 that is larger than the predetermined initial pulse width (e.g., $T_0$) of the timing signal 335 during the switching period $T_B$ and also indicating a time when the switch 344 (e.g., a transistor) becomes open (e.g., turned off). For example, at the time $t_{13}$, the pulse signal 512 changes from the logic low level to the logic high level (e.g., as shown by the waveform 612), indicating the beginning of a time period that represents an actual duration (e.g., $T_{err}$) from a time when the switch 344 (e.g., a transistor) becomes open (e.g., turned off) to a time when the switch 342 (e.g., a transistor) becomes closed (e.g., turned on). In another example, the time $t_{13}$ indicates the beginning of an actual dead time $T_{err}$. In yet another example, at the time $t_{13}$, the logic signal 366 changes from the logic low level to the logic high level (e.g., as shown by the waveform 466), indicating the beginning of a time period that represents a predetermined target duration (e.g., $T_{dt}$) from a time when the switch 344 (e.g., a transistor) becomes open (e.g., turned off) to a time when the switch 342 (e.g., a transistor) becomes closed (e.g., turned on). In yet another example, the time $t_{13}$ indicates the beginning of a predetermined target dead time $T_{dt}$.

According to one embodiment, at the time $t_{14}$, the logic signal 366 changes from the logic high level to the logic low level (e.g., as shown by the waveform 466), indicating the end of the time period that represents the predetermined target duration (e.g., $T_{dt}$) from the time when the switch 344 (e.g., a transistor) becomes open (e.g., turned off) to the time when the switch 342 (e.g., a transistor) becomes closed (e.g., turned on). For example, the time $t_{14}$ indicates the end of the predetermined target dead time $T_{dt}$. In another example, at the time $t_{14}$, the voltage signal 522 starts to increase from the voltage magnitude $V_2$.

According to one embodiment, at the time $t_{15}$, the demagnetization signal 362 changes from the logic high level to the logic low level (e.g., as shown by the waveform 462), indicating the end of the demagnetization period and also indicating the rime when the switch 342 (e.g., a transistor) becomes closed (e.g. turned on). For example, at the time $t_{15}$, the pulse signal 512 changes from the logic high level to the logic low level (e.g., as shown by the waveform 612), indicating the end of the time period that represents the actual duration (e.g., $T_{err}$) from the time when the switch 344 (e.g., a transistor) becomes open (e.g., turned off) to the time when the switch 342 becomes closed (e.g., turned on). In another example, the time $t_{15}$ indicates the end of the actual dead time $T_{err}$. In yet another example, at the time $t_{15}$, the voltage signal 522 increases to a voltage magnitude $V_3$. In yet another example, from the time $t_{15}$ to the time $t_{24}$, the voltage signal 522 remains constant at the voltage magnitude $V_3$.

According to one embodiment, at the time $t_{23}$, the timing signal 335 changes from the logic high level to the logic low level (e.g., as shown by the waveform 435), indicating the end of the pulse width of the timing signal 335 that is larger than the predetermined initial pulse width (e.g., $T_0$) of the timing signal 335 and also indicating a time when the switch 344 (e.g., a transistor) becomes open (e.g., turned off). For example, at the time $t_{23}$, the pulse signal 512 changes from the logic low level to the logic high level (e.g., as shown by the waveform 612), indicating the beginning of a time period that represents an actual duration (e.g., $T_{err}$) from a time when the switch 344 (e.g., a transistor) becomes open (e.g., turned off) to a time when the switch 342 (e.g., a transistor) becomes closed (e.g., turned on). In another example, the time $t_{23}$ indicates the beginning of an actual dead time $T_{err}$. In yet another example, at the time $t_{23}$, the logic signal 366 changes from the logic low level to the logic high level (e.g., as shown by the waveform 466), indicating the beginning of a time period that represents a predetermined target duration (e.g., $T_{dt}$) from a time when the switch 344 (e.g., a transistor) becomes open to a time when the switch 342 becomes closed (e.g., turned on). In yet another example, the time $t_{23}$ indicates the beginning of the predetermined target duration $T_{dt}$.

In one embodiment, at the time $t_{24}$, the logic signal 366 changes from the logic high level to the logic low level (e.g., as shown by the waveform 466), indicating the end of the time period that represents the predetermined target duration (e.g., $T_{dt}$) from the time when the switch 344 (e.g., a transistor) becomes open (e.g., turned off) to the time when the switch 342 (e.g., a transistor) becomes closed (e.g., turned on). For example, the time $t_{24}$ indicates the end of the predetermined target duration $T_{dt}$. In another embodiment, at the time $t_{24}$, the demagnetization signal 362 changes from the logic high level to the logic low level (e.g., as shown by the waveform 462), indicating the end of the demagnetization period and also indicating the time when the switch 342 (e.g., a transistor) becomes closed (e.g., turned on). For example, at the time $t_{24}$, the pulse signal 512 changes from the logic high level to the logic low level (e.g., as shown by the waveform 612), indicating the end of the time period that represents the actual duration (e.g., $T_{err}$) from the time when the switch 344 (e.g., a transistor) becomes open (e.g., turned off) to the time when the switch 342 (e.g., a transistor) becomes closed (e.g., turned on). In another example, the time $t_{24}$ indicates the end of the actual dead time $T_{err}$. In yet another example, for the switching cycle $T_C$, the actual duration (e.g., the actual dead time $T_{err}$) from the time when the switch 344 (e.g., a transistor) becomes open (e.g., turned off) to the time when the switch 342 (e.g., a transistor) becomes closed (e.g., turned on) has become equal to the predetermined target duration (e.g., the predetermined target dead time $T_{dt}$) from the time when the switch 344 (e.g., a transistor) becomes open (e.g., turned off) to the time when the switch 342 (e.g., a transistor) becomes closed (e.g., turned on). In yet another example, from the time $t_{24}$, the voltage signal 522 remains constant at the voltage magnitude $V_3$.

FIG. 7 is a simplified diagram showing certain components of the timing controller 360 as part of the SR controller 330 of the power conversion system 300 according to an embodiment of the present invention. This diagram is merely an example, which should not unduly limit the scope of the claims. One of ordinary skill in the art would recognize many variations, alternatives, and modifications. The timing controller 360 includes current sources 710 and 714, a current sink 712, switches 720, 722, and 724, capacitors 730 and 734, a comparator 740, and an OR gate 750. For example, the current source 710, the current sink 712, the switches 720 and 722, and the capacitor 730 are parts of the voltage-signal generator 520. In another example, the current source 714, the switch 724, the capacitor 734 the comparator 740, and the OR gate 750 are parts of the timing-signal generator 530. In yet another example, the comparator 740 includes a positive input terminal 742 and a negative input terminal 744.

FIG. 8 is a simplified timing diagram for the power conversion system 300 that operates under continuous conduction mode (CCM) and the timing controller 360 as part of the power conversion system 300 as shown in FIGS. 3, 5 and 7 according to an embodiment of the present invention. This diagram is merely an example, Which should not unduly limit the scope of the claims. One of ordinary skill in the art would recognize many variations, alternatives, and modifications.

According to certain embodiments, the simplified timing diagram includes the waveforms 421, 431, 464, 462, 466, 435 and 437 as shown in FIG. 4 and the waveforms 612 and 622 as shown in FIG. 6, and further includes waveform 890 as shown in FIG. 8.

As shown in FIGS. 4, 6 and 8, the waveform 421 represents the drive signal 321 as a function of time, the waveform 431 represents the signal 331 as a function of time, the waveform 464 represents the logic signal 364 as a function of time, the waveform 462 represents the demagnetization signal 362 as a function of time, the waveform 466 represents the logic signal 366 as a function of time, the waveform 435 represents the timing signal 335 as a function of time, the waveform 437 represents the drive signal 337 as a function of time, the waveform 612 represents the pulse signal 512 as a function of time, the waveform 622 represents the voltage signal 522 as a function of time, and the waveform 890 represents a difference between a predetermined initial pulse width (e.g., $T_0$) of the timing signal 335 and an actual pulse width of the timing signal 335 as a function of time.

In one embodiment, at the time $t_1$, the drive signal 321 changes from the logic high level to the logic low level (e.g., as shown by the waveform 421), and the demagnetization signal 362 changes from the logic low level to the logic high level (e.g., as shown by the waveform 462). For example, at the time $t_1$, the logic signal 364 changes from the logic low level to the logic high level (e.g., as shown by the waveform 464), indicating the beginning of a time period that represents a predetermined initial pulse width (e.g., $T_0$) of the timing signal 335 and a predetermined initial pulse width (e.g., $T_0$) of the drive signal 337. In another example, at the time $t_1$, the timing signal 335 changes from the logic low level to the logic high level (e.g., as shown by the waveform 435), indicating the beginning of an actual pulse width of the timing signal 335. In yet another example, at the time $t_1$, the drive signal 337 changes from the logic low level to the logic high level (e.g., as shown by the waveform 437), indicating the beginning of an actual pulse width of the drive signal 337.

According to one embodiment, at the time $t_2$, the logic signal 364 changes from the logic high level to the logic low level (e.g., as shown by the waveform 464), indicating the end of the time period that represents the predetermined initial pulse width (e.g., $T_0$) of the timing signal 335 and the predetermined initial pulse width (e.g., $T_0$) of the drive signal 337. For example, at the time $t_2$, the timing signal 335 changes from the logic high level to the logic low level (e.g., as shown by the waveform 435), indicating the end of the actual pulse width of the timing signal 335 that is equal to the predetermined initial pulse width (e.g., $T_0$) of the timing signal 335. In another example, at the time $t_2$, the drive signal 337 changes from the logic high level to logic low level (e.g., as shown by the waveform 437), indicating the end of the actual pulse width of the drive signal 337 that is initially equal to the predetermined initial pulse width (e.g., $T_0$) of the drive signal 337. In yet another example, at the time $t_2$, the pulse signal 512 changes from the logic low level to the logic high level (e.g., as shown by the waveform 612), indicating the beginning of a time period that represents an actual duration (e.g., $T_{err}$) from a time when the switch 344 (e.g., a transistor) becomes open (e.g., turned off) to a time when the switch 342 (e.g., a transistor) becomes closed (e.g., turned on). In yet another example, the time $t_2$ indicates the beginning of an actual dead time $T_{err}$.

In one embodiment, at the time $t_4$, the drive signal 321 changes from the logic low level to the logic high level (e.g., as shown by the waveform 421), and the demagnetization signal 362 changes from the logic high level to the logic low level (e.g., as shown by the waveform 462). For example, at the time $t_4$, the pulse signal 512 changes from the logic high level to the logic low level (e.g., as shown by the waveform 612), indicating the end of the time period that represents the actual duration (e.g., $T_{err}$) from the time when the switch 344 (e.g., a transistor) becomes open (e.g., turned off) to the time when the switch 342 (e.g., a transistor) becomes closed (e.g., turned on). In another example, the time $t_4$ indicates the end of the actual dead time $T_{err}$. In yet another example, the sum of the actual pulse width of the timing signal 335 (e.g., from the time $t_1$ to the time $t_2$) and the actual dead time (e.g., $T_{err}$ from the time $t_2$ to the time $t_4$) is equal to the off-time period of the drive signal 321 (e.g., from the time $t_1$ to the time $t_2$).

In one embodiment, at the time $t_{11}$, the drive signal 321 changes from the logic high level to the logic low level (e.g., as shown by the waveform 421), and the demagnetization signal 362 changes from the logic low level to the logic high level (e.g., as shown by the waveform 462). For example, at the time $t_{11}$, the logic signal 364 changes from the logic low level to the logic high level (e.g., as shown by the waveform 464), indicating the beginning of a time period that represents a predetermined initial pulse width (e.g., $T_0$) of the timing signal 335 and a predetermined initial pulse width (e.g., $T_0$) of the drive signal 337. In another example, at the time $t_{11}$, the timing signal 335 changes from the logic low level to the logic high level (e.g., as shown by the waveform 435), indicating the beginning of an actual pulse width of the timing signal 335. In yet another example, at the time $t_{11}$, the drive signal 337 changes from the logic low level to the logic high level (e.g., as shown by the waveform 437), indicating the beginning of an actual pulse width of the drive signal 337.

According to one embodiment, at the time $t_{12}$, the logic signal 364 changes from the logic high level to the logic low level (e.g., as shown by the waveform 464), indicating the end of the time period that represents the predetermined initial pulse width (e.g., $T_0$) of the timing signal 335 and the predetermined initial pulse width (e.g., $T_0$) of the drive signal 337.

In one embodiment, at the time $t_{13}$, the timing signal 335 changes from the logic high level to the logic low level (e.g., as shown by the waveform 435), indicating the end of the actual pulse width of the timing signal 335 that exceeds the predetermined initial pulse width (e.g., $T_0$) of the timing signal 335. For example, at the time $t_{13}$, the drive signal 337 changes from the logic high level to the logic low level (e.g., as shown by the waveform 437), indicating the end of the actual pulse width of the drive signal 337 that exceeds the predetermined initial pulse width (e.g., $T_0$) of the drive signal 337. In another example, at the time $t_{13}$, the pulse signal 512 changes from the logic low level to the logic high level (e.g., as shown by the waveform 612), indicating the beginning of a time period that represents an actual duration (e.g., $T_{err}$) from a time when the switch 344 (e.g., a transistor) becomes open (e.g., turned off) to a time when the switch 342 (e.g., a transistor) becomes closed (e.g., turned on). In yet another example, the time $t_{13}$ indicates the beginning of an actual dead time $T_{err}$.

According to one embodiment, at the time $t_{15}$, the drive signal 321 changes from the logic low level to the logic high level (e.g., as shown by the waveform 421), and the demagnetization signal 362 changes from the logic high level to the logic low level (e.g., as shown by the waveform 462). For example, at the time $t_{15}$, the pulse signal 512 changes from the logic high level to the logic low level (e.g., as shown by the waveform 612), indicating the end of the time period that represents the actual duration (e.g., $T_{err}$) from the time when the switch 344 (e.g., a transistor) becomes open (e.g., turned off) to the time when the switch 342 (e.g., a transistor) becomes closed (e.g., turned on). In another example, the time $t_{15}$ indicates the end of the actual dead time $T_{err}$. In yet another example, the sum of the actual pulse width of the timing signal 335 (e.g., from the time $t_{11}$ to the time $t_{13}$) and the actual dead time (e.g., $T_{err}$ from the time $t_{13}$ to the time $t_{15}$) is equal to the off-time period of the drive signal 321 (e.g., from the time $t_{11}$ to the time $t_{15}$).

In one embodiment, at the time $t_{21}$, the drive signal 321 changes from the logic high level to the logic low level (e.g., as shown by the waveform 421), and the demagnetization signal 362 changes from the logic low level to the logic high level (e.g., as shown by the waveform 462). For example, at the time $t_{21}$, the logic signal 364 changes from the logic low level to the logic high level (e.g., as shown by the waveform 464), indicating the beginning of a time period that represents a predetermined initial pulse width (e.g., $T_0$) of the timing signal 335 and a predetermined initial pulse width (e.g., $T_0$) of the drive signal 337. In another example, at the time $t_{21}$, the tinting signal 335 changes from the logic low level to the logic high level (e.g., as shown by the waveform 435), indicating the beginning of an actual pulse width of the timing signal 335. In yet another example, at the time $t_{21}$, the drive signal 337 changes from the logic low level to the logic high level (e.g., as shown by the waveform 437), indicating the beginning of an actual pulse width of the drive signal 337.

According to one embodiment, at the time $t_{22}$, the logic signal 364 changes from the logic high level to the logic low level (e.g., as shown by the waveform 464), indicating the end of the time period that represents the predetermined initial pulse width (e.g., $T_0$) of the timing signal 335 and the predetermined initial pulse width (e.g., $T_0$) of the drive signal 337.

In one embodiment, at the time $t_{23}$, the timing signal 335 changes from the logic high level to the logic low level (e.g., as shown by the waveform 435), indicating the end of the actual pulse width of the timing signal 335 that exceeds the predetermined initial pulse width (e.g., $T_0$) of the timing signal 335. For example, at the time $t_{23}$, the drive signal 337 changes from the logic high level to the logic low level (e.g., as shown by the waveform 437), indicating the end of the actual pulse width of the drive signal 337 that exceeds the predetermined initial pulse width (e.g., $T_0$) of the drive signal 337. In another example, at the time $t_{23}$, the pulse signal 512 changes from the logic low level to the logic high level (e.g., as shown by the waveform 612), indicating the beginning of a time period that represents an actual duration (e.g., $T_{err}$) from a time when the switch 344 (e.g., a transistor) becomes open (e.g., turned off) to a time when the switch 342 (e.g., a transistor) becomes closed (e.g., turned on). In yet another example, the time $t_{23}$ indicates the beginning of an actual dead time $T_{err}$.

According to one embodiment, at the time $t_{24}$, the drive signal 321 changes from the logic low level to the logic high level (e.g., as shown by the waveform 421), and the demagnetization signal 362 changes from the logic high level to the logic low level (e.g., as shown by the waveform 462). For example, at the time $t_{24}$, the pulse signal 512 changes from the logic high level to the logic low level (e.g., as shown by the waveform 612), indicating the end of the time period that represents the actual duration (e.g., $T_{err}$) from the time when the switch 344 (e.g., a transistor) becomes open (e.g., turned off) to the time when the switch 342 (e.g., a transistor) becomes closed (e.g., turned on). In another example, the time $t_{24}$ indicates the end of the actual dead time $T_{err}$. In yet another example, the sum of the actual pulse width of the timing signal 335 (e.g., from the time $t_{21}$ to the time $t_{23}$) and the actual dead time (e.g., $T_{err}$ from the time $t_{23}$ to the time $t_{24}$) is equal to the off-time period of the drive signal 321 (e.g., from the time $t_{21}$ to the time $t_{24}$).

According to certain embodiments, the sum of the actual pulse width of the timing signal 335 (e.g., from the time $t_1$ to the time $t_2$) and the actual dead time (e.g., $T_{err}$ from the time $t_2$ to the time $t_4$) is equal to the off-time period of the drive signal 321 (e.g., from the time $t_1$ to the time $t_2$) during the switching cycle $T_A$, the sum of the actual pulse width of the timing signal 335 (e.g., from the time $t_{11}$ to the time $t_{13}$) and the actual dead time (e.g., $T_{err}$ from the time $t_{13}$ to the time $t_{15}$) is equal to the off-time period of the drive signal 321 (e.g., from the time $t_{11}$ to the time $t_{15}$) during the switching cycle $T_B$, and the sum of the actual pulse width of the timing signal 335 (e.g., from the time $t_{21}$ to the time $t_{23}$) and the actual dead time (e.g., $T_{err}$ from the time $t_{23}$ to the time $t_{24}$) is equal to the off-time period of the drive signal 321 (e.g., from the time $t_{21}$ to the time $t_{24}$) during the switching cycle $T_C$.

According to some embodiments, the off-time period of the drive signal 321 (e.g., from the time $t_1$ to the time $t_2$) during the switching cycle $T_A$, the off-time period of the drive signal 321 (e.g., from the time $t_{11}$ to the time $t_{15}$) during the switching cycle $T_B$, and the actual dead time (e.g., $T_{err}$ from the time $t_{23}$ to the time $t_{24}$) is equal to the off-time period of the drive signal 321 (e.g., from the time $t_{21}$ to the time $t_{24}$) during the switching cycle $T_C$ are equal. For example, the sum of the actual pulse width of the timing signal 335 (e.g., from the time $t_1$ to the time $t_2$) and the actual dead time (e.g., $T_{err}$ from the time $t_2$ to the time $t_4$) during the switching cycle $T_A$, the sum of the actual pulse width of the timing signal 335 (e.g., from the time $t_{11}$ to the time $t_{13}$) and the actual dead time (e.g., $T_{err}$ from the time $t_{13}$ to the time $t_{15}$) during the switching cycle $T_B$, and the sum of the actual pulse width of the timing signal 335 (e.g., from the time $t_{21}$ to the time $t_{23}$) and the actual dead time (e.g., $T_{err}$ from the time $t_{23}$ to the time $t_{24}$) during the switching cycle $T_C$ are equal.

In one embodiment, from the switching cycle $T_A$ to the switching cycle $T_B$, the actual pulse width of the timing signal 335 increases by $\Delta T_{A-B}$ from the time $t_{12}$ to the time $t_{13}$), and the actual duration (e.g., the actual dead time) from the time when the switch 344 (e.g., a transistor) becomes open (e.g., turned off) to the time when the switch 342 (e.g., a transistor) becomes closed (e.g., turned on) decreases by $\Delta T_{A-B}$ (e.g., from the time $t_{12}$ to the time $t_{13}$). In another embodiment, from the switching cycle $T_A$ to the switching cycle $T_C$, the actual pulse width of the timing signal 335 increases by $\Delta T_{A-C}$ (e.g., from the time $t_{22}$ to the time $t_{23}$), and the actual duration (e.g., the actual dead time) from the time when the switch 344 (e.g., a transistor) becomes open (e.g., turned off) to the time when the switch 342 (e.g., a transistor) becomes closed (e.g., turned on) decreases by $\Delta T_{A-C}$ (e.g., from the time $t_{22}$ to the time $t_{23}$).

As shown in FIG. 8, the waveform 890 represents the difference between the predetermined initial pulse width (e.g., $T_0$) of the timing signal 335 and the actual pulse width of the timing signal 335 as a function of time. For example, the time duration (e.g., $T_{dly}$) from the time $t_{12}$ to the time $t_{13}$ represents the increase (e.g., $\Delta T_{A-B}$) of the actual pulse width of the timing signal 335 from the switching cycle $T_A$ to the switching cycle $T_B$, and the time duration (e.g., $T_{dly}$) from the time $t_{12}$ to the time $t_{13}$ also represents the decrease (e.g., $\Delta T_{A-B}$) of the actual dead time from the switching cycle $T_A$ to the switching cycle $T_B$. In another example, the time duration (e.g., $T_{dly}$) from the time $t_{22}$ to the time $t_{23}$ represents the increase (e.g., $\Delta T_{A-C}$) of the actual pulse width of the timing signal 335 from the switching cycle $T_A$ to the switching cycle $T_C$, and the time duration (e.g., $T_{dly}$) from the time $t_{22}$ to the time $t_{23}$ also represents the decrease (e.g., $\Delta T_{A-B}$) of the actual dead time from the switching cycle $T_A$ to the switching cycle $T_C$.

As shown in FIGS. 3, 5 and 7, in one embodiment, the pulse-signal generator 510 receives the demagnetization signal 362 and the timing signal 335 and generates a pulse signal 512 based at least in part on the demagnetization signal 362 and the timing signal 335. For example, the timing signal 335 indicates a time when the switch 344 (e.g., a transistor) becomes open (e.g., turned off), and the demagnetization signal 362 indicates a time when the switch 342 (e.g., a transistor) becomes closed (e.g., turned on). In another example, the pulse signal 512 includes one or more pulses, and each of the one or more pulses corresponds to a pulse width that represents an actual duration (e.g., an actual dead time $T_{err}$) from the time when the switch 344 (e.g., a transistor) becomes open (e.g., turned off) to the time when the switch 342 (e.g., a transistor) becomes closed (e.g., turned on).

In another embodiment, the voltage-signal generator 520 as shown in FIG. 5 includes the current source 710, the current sink 712, the switches 720 and 722, and the capacitor 730, and the control-voltage generator 520 receives the pulse signal 512 and the logic signal 366 and generates a voltage signal 522 based at least in part on the pulse signal 512 and the logic signal 366. For example, the logic signal 366 includes one or more pulses, and each of the one or more pulses corresponds to a pulse width that represents a predetermined target duration (e.g., a predetermined target dead time $T_{dt}$). In another example, the difference in pulse width between the pulse signal 512 and the logic signal 366 represents the difference between the actual duration (e.g., the actual dead time $T_{err}$) and the predetermined target duration (e.g., the predetermined target dead time $T_{dt}$). In yet another example, the voltage signal 522 is generated based at least in part on the difference in pulse width between the pulse signal 512 and the logic signal 366.

In yet another embodiment, the timing-signal generator 530 as shown in FIG. 5 includes the current source 714, the switch 724, the capacitor 734, the comparator 740, and the OR gate 750, and the timing-signal generator 530 receives the voltage signal 522 and the logic signal 364, generates the timing signal 335 based at least in part on the voltage signal 522 and the logic signal 364, and outputs the timing signal 335 to the pulse-signal generator 510 and the gate driver 336. For example, the logic signal 364 includes one or more pulses, and each of the one or more pulses corresponds to a pulse width that represents a predetermined initial pulse width (e.g., $T_0$) of the timing signal 335. In another example, the timing signal 335 includes an initial pulse, and the initial pulse corresponds to a pulse width that is equal to the predetermined initial pulse width (e.g., $T_0$).

As shown in FIG. 7, the pulse-signal generator 510 generates the pulse signal 512 and outputs the pulse signal 512 to the switch 720. For example, as shown by the waveform 612, the pulse signal 512 changes from a logic low level to a logic high level at one or more falling edges of the timing signal 335 (e.g., as shown by the waveform 435 at the time $t_2$, at the time $t_{13}$, and/or at the time $t_{23}$). In another example, as shown by the waveform 612, the pulse signal 512 changes from the logic high level to the logic low level at one or more falling edges of the demagnetization signal 362 (e.g., as shown by the waveform 462 at the time $t_4$, at the time $t_{15}$, and/or at the time $t_{24}$).

In yet another example, the one or more falling edges of the demagnetization signal 362 at the time $t_4$, at the time $t_{15}$, and/or at the time $t_{24}$ (e.g., as shown by the waveform 462) are generated in response to one or more rising edges of the signal 331 at the time $t_4$, at the time $t_{15}$, and/or at the time $t_{24}$ respectively (e.g., as shown by the waveform 431). In yet another example, the one or more rising edges of the signal 331 at the time $t_4$, at the time $t_{15}$, and/or at the time $t_{24}$ (e.g., as shown by the waveform 431) are generated in response to one or more rising edges of the drive signal 321 at the time $t_4$, at the time $t_{15}$, and/or at the time $t_{24}$ respectively (e.g., as shown by the waveform 421). In yet another example, the one or more falling edges of the demagnetization signal 362 at the time $t_4$, at the time $t_{15}$, and/or at the time $t_{24}$ (e.g., as shown by the waveform 462) represent the one or more rising edges of the drive signal 321 at the time $t_4$, at the time $t_{15}$, and/or at the time $t_{24}$ respectively (e.g., as shown by the waveform 421).

In one embodiment, the switch 720 receives the pulse signal 512. For example, the switch 720 is closed (e.g., turned on) if the pulse signal 512 is at the logic high level, and the switch 720 is open (e.g., turned off) if the pulse signal 512 is at the logic low level. In another example, when the pulse signal 512 is at the logic high level, the switch 720 remains closed, and the current source 710 generates a current 760 that flows through the switch 720.

In another embodiment, the switch 722 receives the logic signal 366. For example, the switch 722 is closed (e.g., turned on) if the logic signal 366 is at the logic high level, and the switch 722 is open (e.g., turned off) if the logic signal 366 is at the logic low level. In another example, when the logic signal 366 is at the logic high level, the switch 722 remains closed, and the current source 712 generates a current 762 that flows through the switch 722. In yet another example, the current 760 and the current 762 are equal in magnitude (e.g., the magnitude $I_1$), As shown in FIG. 7, when both the pulse signal 512 and the logic signal 366 are at the logic high level, both the switches 720 and 722 are closed (e.g., from the time $t_2$ to the time $t_3$, from the time $t_{13}$ to the time $t_{14}$, and/or from the time $t_{23}$ to the time $t_{24}$) according to certain embodiments. For example, when both the pulse signal 512 and the logic signal 366 are at the logic high level, the capacitor 730 is not additionally charged or discharged, and the voltage signal 522 remains unchanged as shown by the waveform 622 (e.g., from the time $t_2$ to the time $t_3$, from the time $t_{13}$ to the time $t_{14}$, and/or from the time $t_{23}$ to the time $t_{24}$). In another example, when the pulse signal 512 is at the logic high level and the logic signal 366 is at the logic low level, the capacitor 730 is additionally charged, and the voltage signal 522 increases as shown by the waveform 622 (e.g., from the time $t_3$ to the time $t_4$ and/or from the time $t_{14}$ to the time $t_{15}$).

According to one embodiment, the positive input terminal 742 of the comparator 740 receives the voltage signal 522, and the negative input terminal 744 of the comparator 740 receives a voltage signal 784 from the capacitor 734. For example, the capacitor 734 is coupled to the current source 714, which generates a current 764 (e.g., with magnitude $I_2$). In another example, the capacitor 734 is also coupled to the switch 724, which receives the logic signal 364.

According to another embodiment, when the logic signal 364 is at the logic high level, the switch 724 is closed (e.g., as shown by the waveform 464). For example, the switch 724 is closed from the time $t_1$ to the time $t_2$, from the time $t_{11}$ to the time $t_{12}$, and/or from the time $t_{21}$ to the time $t_{22}$, so that the capacitor 734 is completed discharged and the voltage signal 784 is at the ground at the time $t_1$, the time $t_{11}$, and/or the time $t_{21}$. According to yet another embodiment, when the logic signal 364 is at the logic low level, the switch 724 is open (as shown by the waveform 464). For example, the switch 724 becomes open at the time $t_1$, the time $t_{11}$, and/or the time $t_{21}$, and the capacitor 734 is charged by the current 764 so that the voltage signal 784 increases from the ground.

In one embodiment, the comparator 740 compares the voltage signal 522 and the voltage signal 784 and generates a comparison signal 746. For example, the comparison signal 746 is at a logic high level when the voltage signal 522 is larger than the voltage signal 784 in magnitude. In another example, the comparison signal 746 is at a logic low level when the voltage signal 522 is smaller than the voltage signal 784 in magnitude.

In another embodiment, the OR gate 750 receives the comparison signal 746 and the logic signal 364 and generates the timing signal 335. For example, from the time $t_1$ to the time $t_2$, the logic signal 364 is at the logic high level, and the timing signal 335 is at the logic high level (e.g., as shown by the waveform 435). In another example, at the time $t_2$, the voltage signal 784 starts increasing from the ground, and immediately becomes larger than the voltage signal 522, which is also at the ground, In yet another example, the timing signal 335 is at the logic high level from the time $t_1$ to the time $t_2$, and the timing signal 335 changes to the logic low level at the time $t_2$ (e.g., as shown by the waveform 435).

In yet another embodiment, from the time $t_{11}$ to the time $t_{12}$, the logic signal 364 is at the logic high level, and the timing signal 335 is at the logic high level (e.g., as shown by the waveform 435). For example, at the time $t_{12}$, the voltage signal 784 starts increasing from the ground, and at the time $t_{13}$, the voltage signal 784 becomes larger than the voltage signal 522, so the timing signal 335 is at the logic high level from the time $t_{12}$ to the time $t_{13}$. In another example, the timing signal 335 is at the logic high level from the time $t_{11}$ to the time $t_{13}$, and the timing signal 335 changes to the logic low level at the time $t_{13}$ (e.g., as shown by the waveform 435).

In yet another embodiment, from the time $t_{21}$ to the time $t_{22}$, the logic signal 364 is at the logic high level, and the timing signal 335 is at the logic high level (e.g., as shown by the waveform 435), For example, at the time $t_{22}$, the voltage signal 784 starts increasing from the ground, and at the time $t_{23}$, the voltage signal 784 becomes larger than the voltage signal 522, so the timing signal 335 is at the logic high level from the time $t_{22}$ to the time $t_{23}$. In another example, the timing signal 335 is at the logic high level from the time $t_{21}$ to the time $t_{23}$, and the timing signal 335 changes to the logic low level at the time $t_{13}$ (e.g., as shown by the waveform 435).

In yet another embodiment, if the timing signal 335 is at the logic high level, the drive signal 337 is also at the logic high level and the switch 344 (e.g., a transistor) is closed (e.g., turned on), and if the timing signal 335 is at the logic low level, the drive signal 337 is also at the logic low level and the switch 344 (e.g., a transistor) is open (e.g., turned off).

According to one embodiment, a pulse width of the timing signal 335 is determined by:

$$T_{sron}(n) = T_0 + T_{dly}(n) \quad \text{(Equation 1)}$$

where $T_{sron}(n)$ represents an actual pulse width of the timing signal 335 during the $n^{th}$ switching cycle. Additionally, $T_0$ represents a predetermined initial pulse width of the timing signal 335. Moreover, $T_{dly}(n)$ represents an increase in actual pulse width of the timing signal 335 during the $n^{th}$ switching cycle in comparison with the predetermined initial pulse width of the timing signal 335. Also, n is a positive integer. For example, the $n^{th}$ switching cycle is the switching cycle $T_A$. In another example, the $n^{th}$ switching cycle is the switching cycle $T_B$. In yet another example, the $n^{th}$ switching cycle is the switching cycle $T_C$.

According to another embodiment, if n is equal to 1, $$T_{dly}(1) = 0 \quad \text{(Equation 2)}$$

where $T_{dly}(1)$ represents an increase in actual pulse width of the timing signal 335 during the $1^{st}$ switching cycle in comparison with the predetermined initial pulse width of the timing signal 335. For example, the $1^{st}$ switching cycle is the switching cycle $T_A$.

According to yet another example, if n is a positive integer that is larger than 1, $$T_{dly}(n) = \frac{C_2}{I_2} \times \left[ \frac{I_1}{C_1} \times (T_{err}(n-1) - T_{dt}) + V_{control}(n-1) \right] \quad \text{(Equation 3)}$$

where $T_{dly}(n)$ represents an increase in actual pulse width of the timing signal 335 during the $n^{th}$ switching cycle in comparison with the predetermined initial pulse width of the timing signal 335, Additionally, $T_{err}(n-1)$ represents an actual duration from the time when the switch 344 (e.g., a transistor) becomes open (e.g., turned off) to the time when the switch 342 (e.g., a transistor) becomes closed (e.g., turned on) during the $(n-1)^{th}$ switching cycle, and $V_{control}(n-1)$ represents the magnitude of the voltage signal 522 at the beginning of the $(n-1)^{th}$ switching cycle. Moreover, $T_{dt}$ represents a predetermined target duration from the time when the switch 344 (e.g., a transistor) becomes open (e.g., turned off) to the time when the switch 342 (e.g., a transistor) becomes closed (e.g., turned on). Also, $C_1$ represents the capacitance of the capacitor 730, and $C_2$ represents the capacitance of the capacitor 734. Additionally, $I_1$ represents the magnitude of the current 760 and also represents the magnitude of the current 762, and $I_2$ represents the magnitude of the current 764. For example, the $(n-1)^{th}$ switching cycle is the switching cycle $T_A$, and the $n^{th}$ switching cycle is the switching cycle $T_B$. In another example, the $(n-1)^{th}$ switching cycle is the switching cycle $T_B$, and the $n^{th}$ switching cycle is the switching cycle $T_C$.

As shown in FIG. 8, n is equal to 3 for the switching cycle $T_C$ and n is equal to 4 for the switching cycle that immediately follows the switching cycle $T_C$, according to certain embodiments. For example.

$$T_{err}(4-1) = T_{dt} \quad \text{(Equation 4)}$$

so $$T_{dly}(4) = \frac{C_2}{I_2} \times [V_{control}(4-1)] = T_{dly}(3) \quad \text{(Equation 5)}$$

and $$T_{sron}(4) = T_0 + T_{dly}(4) = T_0 + T_{dly}(3) = T_{sron}(3) \quad \text{(Equation 6)}$$

In another example, during the switching cycle $T_C$ and also during switching cycles following the switching cycle $T_C$, the actual duration $T_{err}$ from the time when the switch 344 (e.g., a transistor) becomes open (e.g., turned off) to the time when the switch 342 (e.g., a transistor) becomes closed (e.g., turned on) remains equal to a predetermined target duration $T_{dt}$ from the time when the switch 344 (e.g., a transistor) becomes open (e.g., turned off) to the time when the switch 342 (e.g., a transistor) becomes closed (e.g., turned on). In yet another example, during the switching cycle $T_C$ and also during switching cycles following the switching cycle $T_C$, an actual pulse width $T_{sron}$ of the timing signal 335 remains constant.

According to some embodiments, if the actual duration $T_{err}$ becomes equal to the predetermined target duration $T_{dt}$, (e.g., during the switching cycle $T_C$), the closed-loop convergence is reached. For example, the predetermined target duration $T_{dt}$ is chosen to achieve a good tradeoff between reliability and efficiency. In another example, the predetermined target duration $T_{dt}$ is set to be equal to 0.5 µs.

Returning to FIGS. 3 and 5, the SR controller 330 uses a closed-loop control mechanism to achieve the adaptive control of dead time (e.g., $T_{err}$), and the dead time is an actual duration from the time when the switch 344 (e.g., a transistor) becomes open (e.g., turned off) to the time when the switch 342 (e.g., a transistor) becomes closed (e.g., turned on), according to certain embodiments. For example, the SR controller 330 provides a predetermined initial pulse width (e.g., $T_0$) for the timing signal 335 and for the drive signal 337. In another example, the predetermined initial pulse width (e.g., $T_0$) is short enough so that an actual pulse width for the timing signal 335 and for the drive signal 337 that is equal to the predetermined initial pulse width (e.g., $T_0$) would not result in the shoot-through of the transformer at full load condition.

In one embodiment, the SR controller 330 detects the demagnetization period of the power conversion system 300 (e.g., a power converter) by detecting the falling edge of the signal 331 (e.g., $V_d$) and the rising edge of the signal 331 (e.g., $V_d$). For example, the demagnetization period of the power conversion system 300 starts at the time $t_1$ and ends at the time $t_4$ as shown in FIG. 6. In another example, the demagnetization period of the power conversion system 300 starts at the time $t_{11}$ and ends at the time $t_{15}$ as shown in FIG. 6. In yet another example, the demagnetization period of the power conversion system 300 starts at the time $t_{21}$ and ends at the time $t_{24}$ as shown in FIG. 6.

In another embodiment, the SR controller 330 compares the demagnetization period of the power conversion system 300 and an actual pulse width of the timing signal 335, and determines the actual dead time (e.g., $T_{err}$), which is for example an actual duration from the time when the switch 344 (e.g., a transistor) becomes open (e.g., turned off) to the time when the switch 342 (e.g., a transistor) becomes closed (e.g., turned on). For example, the SR controller 330 compares the actual dead time (e.g., $T_{err}$) and the predetermined target duration (e.g., $T_{dt}$). In another example, the SR controller 330 gradually increases, cycle by cycle, the actual pulse width of the timing signal 335 from the predetermined initial pulse width (e.g., $T_0$), and gradually decreases, cycle by cycle, the actual dead time (e.g., $T_{err}$) until the actual dead time (e.g., $T_{err}$) becomes equal to the predetermined target dead time (e.g., $T_{dt}$).

As shown in FIG. 8, the actual duration (e.g., $T_{err}$) from the time when the switch 344 (e.g., a transistor) becomes open (e.g., turned off) to the time when the switch 342 (e.g., a transistor) becomes closed (e.g., turned on) decreases from the switching cycle $T_A$ to the switching cycle $T_B$ and also from the switching cycle $T_B$ to the switching cycle $T_C$, until the actual duration (e.g., $T_{err}$) becomes equal to the predetermined target dead time (e.g., $T_{dt}$) during the switching cycle $T_C$, according to one embodiment. For example, the difference between the actual duration (e.g., $T_{err}$) and the predetermined target dead time(e.g., $T_{dt}$) decreases from the switching cycle $T_A$ to the switching cycle $T_B$ and also from the switching cycle $T_B$ to the switching cycle $T_C$, until the difference between the actual duration (e.g., $T_{err}$) and the predetermined target dead time (e.g., $T_{dt}$) becomes zero during the switching cycle $T_C$.

According to another embodiment, the voltage signal 522 (e.g., $V_{contol}$) increases during the difference between the actual duration (e.g., $T_{err}$) and the predetermined target dead time (e.g., $T_{dt}$). For example, for the switching cycle $T_A$, the voltage signal 522 (e.g., $V_{control}$) increases from the voltage magnitude $V_1$ to the voltage magnitude $V_2$ during a time duration from the time $t_3$ to the time $t_4$. In another example, for the switching cycle $T_B$, the voltage signal 522 (e.g., $V_{control}$) increases from the voltage magnitude $V_2$ to the voltage magnitude $V_3$ during a time duration from the time $t_{14}$ to the time $t_{15}$. In yet another example, for the switching cycle $T_C$, the voltage signal 522 (e.g., $V_{control}$) remains constant at the voltage magnitude $V_3$, because the difference between the actual duration (e.g., $T_{err}$) and the predetermined target dead time (e.g., $T_{dt}$) is equal to zero during the switching cycle $T_C$.

In one embodiment, the difference between the actual duration (e.g., $T_{err}$) and the predetermined target dead time (e.g., $T_{dt}$) decreases from the switching cycle $T_A$ to the switching cycle $T_B$ and also from the switching cycle $T_B$ to the switching cycle $T_C$, so the magnitude of increase for the voltage signal 522 (e.g., $v_{control}$) also decreases. For example, $\Delta V_{1-2}$ is equal to the voltage magnitude $V_2$ minus the voltage magnitude $V_1$. In another example, $\Delta V_{2-3}$ is equal to the voltage magnitude $V_3$ minus the voltage magnitude $V_2$. In yet another example, $\Delta V_{2-3}$ is smaller than $\Delta V_{1-2}$.

In another embodiment, the magnitude of increase for the voltage signal 522 determines the magnitude of decrease of the actual duration (e.g., $T_{err}$) from the switching cycle $T_A$ to the switching cycle $T_B$ and also from the switching cycle $T_B$ to the switching cycle $T_C$. For example, the magnitude of decrease of the actual duration (e.g., $T_{err}$) from the switching cycle $T_A$ to the switching cycle $T_B$ is represented by $D_{A-B}$, which is equal to the time duration from the time $t_2$ to the time $t_4$ minus the time duration from the time $t_{13}$ to the time $t_{15}$. In another example, the magnitude of decrease of the actual duration (e.g., $T_{err}$) from the switching cycle $T_B$ to the switching cycle $T_C$ is represented by $D_{B-C}$, which is equal to the time duration from the time $t_{13}$ to the time $t_{15}$ minus the time duration from the time $t_{23}$ to the time $t_{24}$. In yet another example, $D_{B-C}$ is smaller than $D_{A-B}$.

According to certain embodiments, the actual duration e.g., $T_{err}$) from the time when the switch 344 (e.g., a transistor) becomes open (e.g., turned off) to the time when the switch 342 (e.g., a transistor) becomes closed (e.g., turned on) decreases from one switching cycle to another switching cycle, until after one or more switching cycles, the actual duration (e.g., $T_{err}$) becomes equal to the predetermined target dead time (e.g., $T_{dt}$). For example, the magnitude of decrease of the actual duration (e.g., $T_{err}$) from one switching cycle to another switching cycle decreases as the actual duration (e.g. $T_{err}$) approaches the predetermined target dead time (e.g., $T_{dt}$).

According to some embodiments, the number of switching cycles needed for the actual duration (e.g., $T_{err}$) to become equal to the predetermined target dead time (e.g., $T_{dt}$) depends at least in part on the difference between the predetermined target dead time (e.g., $T_{dt}$) and the initial magnitude of the actual duration (e.g., $T_{err}$) that corresponds to the predetermined initial pulse width (e.g., $T_0$), and also depends at least in part on the magnitude of decrease of the actual duration (e.g., $T_{err}$) from one switching cycle to another switching cycle. For example, the magnitude of decrease of the actual duration (e.g., $T_{err}$) from one switching cycle to another switching cycle is not constant. In another example, as the actual duration (e.g., $T_{err}$) approaches the predetermined target dead time (e.g., $T_{dt}$), the magnitude of decrease of the actual duration (e.g., $T_{err}$) from one switching cycle to another switching cycle decreases. In another example, the magnitude of decrease (e.g., $D_{B-C}$) of the actual duration (e.g., $T_{err}$) from the switching cycle $T_B$ to the switching cycle $T_C$ is smaller than the magnitude of decrease (e.g., $D_{A-B}$) of the actual duration (e.g., $T_{err}$) from the switching cycle $T_A$ to the switching cycle $T_B$.

According to another embodiment, a system controller (e.g., the controller 330) for regulating a power converter (e.g., the power converter 300) includes a first controller terminal (e.g., the terminal 338) and a second controller terminal (e.g., the terminal 339). The system controller (e.g., the controller 330) is configured to: receive, at the first controller terminal, an input signal (e.g., the signal 331);

generate a drive signal (e.g., the signal 337) based at least in part on the input signal, the drive signal being associated with an on-time period (e.g., from the time $t_1$ to the time $t_2$) and an off-time period (e.g., from the time $t_2$ to the time $t_{11}$), the on-time period including a first beginning (e.g., the time $t_1$) and a first end (e.g., the time $t_2$); and output, at the second controller terminal, the drive signal to a switch (e.g., the transistor 344) to close (e.g., turn on) the switch during the on-time period and open (e.g., turn off) the switch during the off-time period to affect a current (e.g., the current 346) associated with a secondary winding (e.g., the secondary winding 314) of the power converter. The system controller is further configured to: detect a demagnetization period (e.g., from the time $t_1$ to the time $t_4$) associated with the secondary winding based at least in part on the input signal, the demagnetization period including a second beginning (e.g., the time $t_1$) and a second end (e.g., the time $t_4$), the second beginning (e.g., the time $t_1$) being the same as the first beginning (e.g., the time $t_1$), the second end (e.g., the time $t_4$) following the first end (e.g., the time $t_2$); determine a time duration (e.g., from the time $t_2$ to the time $t_4$) from the first end to the second end, the time duration minus a first predetermined duration (e.g., $T_{dt}$ from the time $t_2$ to the time $t_3$) being equal to a duration difference (e.g., from the time $t_3$ to the time $t_4$); and increase the on-time period from a first duration (e.g., the duration from the time $t_1$ to the time $t_2$) to a second duration (e.g., the duration from the time $t_{11}$ to the time $t_{13}$) based at least in part on the duration difference (e.g., from the time $t_3$ to the time $t_4$). For example, the system controller is implemented according to at least FIG. 3 and/or FIG. 4.

In another example, the system controller (e.g., the controller 330) is further configured to increase the on-time period from the first duration (e.g., the duration from the time $t_{11}$ to the time $t_{13}$) to the second duration (e.g., the duration from the time $t_{21}$ to the time $t_{23}$) based at least in part on the duration difference (e.g., from the time $t_{14}$ to the time $t_{15}$) to make the time duration (e.g., from the time $t_{23}$ to the time $t_{24}$) equal to the first predetermined duration (e.g., $T_{dt}$ from the time $t_{23}$ to the time $t_{24}$). In yet another example, the system controller (e.g., the controller 330) further includes a logic controller (e.g., the controller 334) configured to generate a first signal (e.g., the signal 362) based on at least information associated with the input signal and to generate a second signal (e.g., the signal 366), the first signal indicating the demagnetization period (e.g., from the time $t_1$ to the time $t_4$), the second signal indicating the first predetermined duration (e.g., $T_{dt}$ from the time $t_2$ to the time $t_3$).

In yet another example, the system controller (e.g., the controller 330) further includes a timing controller (e.g., the controller 360) configured to receive the first signal and the second signal and generate a third signal (e.g., the signal 335) based at least in part on the first signal and the second signal, the third signal indicating the on-time period and the off-time period. In yet another example, the system controller (e.g., the controller 330) further includes a gate driver (e.g., the driver 336) configured to receive the third signal and generate the drive signal based at least in part on the third signal. In yet another example, the timing controller (e.g., the controller 360) includes: a pulse-signal generator (e.g., the pulse-signal generator 510) configured to receive the first signal (e.g., the signal 362) and generate a pulse signal (e.g., the pulse signal 512) based at least in part on the first signal, the pulse signal indicating the time duration (e.g., from the time $t_2$ to the time $t_4$) from the first end to the second end; a voltage-signal generator (e.g., the voltage-signal generator 520) configured to receive the pulse signal and the second signal (e.g., the signal 366) and generate a voltage signal (e.g., the voltage signal 522) based at least in part on the pulse signal and the second signal, the voltage signal being related to the duration difference (e.g., from the time $t_3$ to the time $t_4$) and a timing-signal generator (e.g., the timing-signal generator 530) configured to receive the voltage signal and generate the third signal (e.g., the signal 335) based at least in part on the voltage signal. In yet another example, the timing-signal generator (e.g., the timing-signal generator 530) is further configured to receive a fourth signal (e.g., the signal 364), the fourth signal indicating a second predetermined duration (e.g., $T_0$ from the time $t_1$ to the time $t_2$). In yet another example, the timing-signal generator (e.g., the tinting-signal generator 530) is further configured to generate the third signal (e.g., the signal 335) based at least in part on the fourth signal, the third signal indicating the on-time period (e.g., from the time $t_1$ to the time $t_2$) being equal to the second predetermined duration (e.g., $T_0$ from the time $t_1$ to the time $t_2$).

In yet another example, the timing-signal generator (e.g., the timing-signal generator 530) is further configured to output the third signal (e.g., the signal 335) to the gate driver (e.g., the driver 336) and the pulse-signal generator (e.g., the pulse-signal generator 510), and the pulse-signal generator (e.g., the pulse-signal generator 510) is further configured to receive the third signal (e.g., the signal 335) and generate the pulse signal (e.g., the pulse signal 512) based at least in part on the first signal (e.g., the signal 362) and the third signal (e.g., the signal 335). In yet another example, the voltage-signal generator (e.g., the voltage-signal generator 520) includes a first current source (e.g., the current source 710), a first switch (e.g., the switch 720) coupled to the first current source, a second switch (e.g., the switch 722) coupled to the first switch, a current sink (e.g., the current sink 712) coupled to the second switch, and a first capacitor (e.g., the capacitor 730) coupled to the first switch and the second switch. The first switch is configured to receive the pulse signal (e.g., the pulse signal 512), and the second switch is configured to receive the second signal (e.g., the signal 366).

In yet another example, the first switch (e.g., the switch 720) is configured to be closed in response to the pulse signal (e.g., the pulse signal 512) being at a first logic level, and the first switch (e.g., the switch 720) is further configured to be open in response to the pulse signal (e.g., the pulse signal 512) being at a second logic level. The first logic level and the second logic level are different. In yet another example, the second switch (e.g., the switch 722) is configured to be closed in response to the second signal (e.g., the signal 366) being at the first logic level, and the second switch (e.g., the switch 722) is further configured to be open in response to the second signal (e.g., the signal 366) being at the second logic level. In yet another example, the first current source (e.g., the current source 710) is configured to generate a first current (e.g., the current 760), and the current sink (e.g., the current sink 712) is configured to generate a second current (e.g., the current 762). The system controller (e.g., the controller 330) of claim 13 wherein the first current (e.g., the current 760) and the second current (e.g., the current 762) are equal in magnitude.

In yet another example, the timing-signal generator (e.g., the timing-signal generator 530) includes: a second capacitor (e.g., the capacitor 734); a third switch (e.g., the switch 724) coupled to the second capacitor; a second current source (e.g., the current source 714) coupled to the second capacitor and the third switch; a comparator (e.g., the comparator 740) including a first comparator terminal (e.g., the terminal 742) and a second comparator terminal (e.g., the terminal 744), the first comparator terminal being coupled to the first switch, the second switch, and the first capacitor, the second comparator terminal being coupled to the second capacitor, the third switch, and the second current source, the comparator (e.g., the comparator 740) being configured to generate a comparison signal (e.g., the comparison signal 746); and an OR gate (e.g., the OR. gate 750) configured to receive the comparison signal and a fourth signal (e.g., the signal 364) and generate the third signal (e.g., the signal 335) based at least in part on the comparison signal and the fourth signal, the fourth signal indicating a second predetermined duration (e.g., $T_0$ from the time $t_1$ to the time $t_2$). In yet another example, the third switch (e.g., the switch 724) is configured to receive the fourth signal (e.g., the signal 364). In yet another example, the third switch (e.g., the switch 724) is configured to be closed in response to the fourth signal (e.g., the signal 364) being at a first logic level, and the third switch (e.g., the switch 724) is configured to be open in response to the fourth signal (e.g., the signal 364) being at a second logic level. The first logic level and the second logic level are different. In yet another example, the switch is a transistor (e.g., the transistor 344).

According to yet another embodiment, a method for regulating a power converter (e.g., the power converter 300) includes: receiving an input signal (e.g., the signal 331); generating a drive signal (e.g., the signal 337) based at least in part on the input signal, the drive signal being associated with an on-time period (e.g., from the time $t_1$ to the time $t_2$) and an off-time period (e.g., from the time $t_2$ to the time $t_{11}$), the on-time period including a first beginning (e.g., the time $t_1$) and a first end (e.g., the time $t_2$) and outputting the drive signal to a switch (e.g., the transistor 344) to close (e.g., turn on) the switch during the on-time period and open (e.g., turn off) the switch during the off-time period to affect a current (e.g., the current 346) associated with a secondary winding (e.g., the secondary winding 314) of the power converter. The generating a drive signal (e.g., the signal 337) based at least in part on the input signal includes: detecting a demagnetization period (e.g., from the time $t_1$ to the time $t_4$) associated with the secondary winding based at least in part on the input signal, the demagnetization period including a second beginning (e.g., the time $t_1$) and a second end (e.g., the time $t_4$), the second beginning (e.g., the time $t_1$) being the same as the first beginning (e.g., the time $t_1$), the second end (e.g., the time $t_4$) following the first end (e.g., the time $t_2$); determining a time duration (e.g., from the time $t_2$ to the time $t_4$) from the first end to the second end, the time duration minus a first predetermined duration (e.g., $T_{dt}$ from the time $t_2$ to the time $t_3$) being equal to a duration difference (e.g., from the time $t_3$ to the rime $t_4$); and increasing the on-time period from a first duration (e.g., the duration from the time $t_1$ to the time $t_2$) to a second duration (e.g., the duration from the time $t_{11}$ to the time $t_{13}$) based at least in part on the duration difference (e.g., from the time $t_3$ to the time $t_4$). For example, the method is implemented according to at least FIG. 3 and/or FIG. 4.

In another example, the increasing the on-time period from a first duration to a second duration based at least in part on the duration difference includes increasing the on-time period from the first duration (e.g., the duration from the time $t_{11}$ the time $t_{13}$) to the second duration (e.g., the duration from the time $t_{21}$ to the time $t_{23}$) based at least in part on the duration difference (e.g., from the time $t_{14}$ to the time $t_{15}$) to make the time duration (e.g., from the time $t_{23}$ to the time $t_{24}$) equal to the first predetermined duration (e.g., $T_{dt}$ from the time $t_{23}$ to the time $t_{24}$). In yet another example, the generating a drive signal (e.g., the signal 337) based at least in part on the input signal includes: generating a first signal (e.g., the signal 362) based on at least information associated with the input signal, the first signal indicating the demagnetization period (e.g., from the time $t_1$ to the time $t_4$); and generating a second signal (e.g., the signal 366), the second signal indicating the first predetermined duration (e.g., $T_{dt}$ from the time $t_2$ to the time $t_3$).

In yet another example, the generating a drive signal (e.g., the signal 337) based at least in pail on the input signal further includes receiving the first signal and the second signal, and generating a third signal (e.g., the signal 335) based at least in part on the first signal and the second signal, the third signal indicating the on-time period and the off-time period. In yet another example, the generating a drive signal (e.g., the signal 337) based at least in part on the input signal further includes receiving the third signal, and generating the drive signal based at least in part on the third signal. In yet another example, the generating a third signal (e.g., the signal 335) based at least in pail on the first signal and the second signal includes: receiving the first signal (e.g., the signal 362); generating a pulse signal (e.g., the pulse signal 512) based at least in part on the first signal, the pulse signal indicating the time duration (e.g., from the time $t_2$ to the time $t_4$) from the first end to the second end; receiving the pulse signal and the second signal (e.g., the signal 366); generating a voltage signal (e.g., the voltage signal 522) based at least in part on the pulse signal and the second signal, the voltage signal being related to the duration difference (e.g., from the time $t_3$ to the time $t_4$); receiving the voltage signal; and generating the third signal (e.g., the signal 335) based at least in part on the voltage signal.

In yet another example, the generating a drive signal (e.g., the signal 337) based at least in part on the input signal further includes receiving a fourth signal (e.g., the signal 364), the fourth signal indicating a second predetermined duration (e.g., $T_0$ from the time $t_1$ to the time $t_2$). In yet another example, the generating a drive signal (e.g., the signal 337) based at least in part on the input signal further includes generating the third signal (e.g., the signal 335) based at least in part on the fourth signal, the third signal indicating the on-time period (e.g., from the time $t_1$ to the time $t_2$) being equal to the second predetermined duration (e.g., $T_0$ from the time $t_1$ to the time $t_2$). In vet another example, the method further includes receiving the third signal (e.g., the signal 335). The generating a pulse signal (e.g., the pulse signal 512) based at least in part on the first signal includes generating the pulse signal (e.g., the pulse signal 512) based at least in part on the first signal (e.g., the signal 362) and the third signal (e.g., the signal 335).

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for a power converter, the system controller comprising:
a controller terminal;
wherein the system controller is configured to:
receive an input signal; and
output, at the controller terminal, a drive signal to a switch to affect a current associated with a secondary winding of the power converter, the drive signal being associated with the input signal, an on-time period, and an off-time period, the on-time period including a first beginning and a first end;
wherein the system controller is further configured to:
detect a demagnetization period associated with the secondary winding based at least in part on the input signal, the demagnetization period including a second beginning and a second end, the second beginning being the same as the first beginning, the second end following the first end;
determine a time duration from the first end to the second end, the time duration minus a first predetermined duration being equal to a duration difference; and
increase the on-time period from a first duration to a second duration based at least in part on the duration difference.

2. The system controller of claim 1 is further configured to increase the on-time period from the first duration to the second duration based at least in part on the duration difference to make the time duration equal to the first predetermined duration.

3. The system controller of claim 1, and further comprising a first signal generator configured to generate a first signal based on at least information associated with the input signal and generate a second signal, the first signal indicating the demagnetization period, the second signal indicating the first predetermined duration.

4. The system controller of claim 3, and further comprising a second signal generator configured to receive the first signal and the second signal and generate a third signal based at least in part on the first signal and the second signal, the third signal indicating the on-time period and the off-time period.

5. The system controller of claim 4, and further comprising a driver configured to receive the third signal and generate the drive signal based at least in part on the third signal.

6. The system controller of claim 5 wherein the second signal generator includes:
a pulse-signal generator configured to receive the first signal and generate a pulse signal based at least in part on the first signal, the pulse signal indicating the time duration from the first end to the second end;
a voltage-signal generator configured to receive the pulse signal and the second signal and generate a voltage signal based at least in part on the pulse signal and the second signal, the voltage signal being related to the duration difference; and
a timing-signal generator configured to receive the voltage signal and generate the third signal based at least in part on the voltage signal.

7. The system controller of claim 6 wherein the timing-signal generator is further configured to receive a fourth signal, the fourth signal indicating a second predetermined duration.

8. The system controller of claim 7 wherein the timing-signal generator is further configured to generate the third signal based at least in part on the fourth signal, the third signal indicating the on-time period being equal to the second predetermined duration.

9. The system controller of claim 6 wherein:
the timing-signal generator is further configured to output the third signal to the driver and the pulse-signal generator; and
the pulse-signal generator is further configured to receive the third signal and generate the pulse signal based at least in part on the first signal and the third signal.

10. The system controller of claim 6 wherein the voltage-signal generator includes:
a first current source;
a first switch coupled to the first current source;
a second switch coupled to the first switch;
a current sink coupled to the second switch; and
a first capacitor coupled to the first switch and the second switch;
wherein:
the first switch is configured to receive the pulse signal; and
the second switch is configured to receive the second signal.

11. The system controller of claim 10 wherein:
the first switch is configured to be closed in response to the pulse signal being at a first logic level; and
the first switch is further configured to be open in response to the pulse signal being at a second logic level;
wherein the first logic level and the second logic level are different.

12. The system controller of claim 11 wherein:
the second switch is configured to be closed in response to the second signal being at the first logic level; and
the second switch is further configured to be open in response to the second signal being at the second logic level.

13. The system controller of claim 12 wherein:
the first current source is configured to generate a first current; and
the current sink is configured to generate a second current.

14. The system controller of claim 13 wherein the first current and the second current are equal in magnitude.

15. The system controller of claim 10 wherein the timing-signal generator includes:
a second capacitor;
a third switch coupled to the second capacitor;
a second current source coupled to the second capacitor and the third switch;
a comparator including a first comparator terminal and a second comparator terminal, the first comparator terminal being coupled to the first switch, the second switch, and the first capacitor, the second comparator terminal being coupled to the second capacitor, the third switch, and the second current source, the comparator being configured to generate a comparison signal; and
an OR gate configured to receive the comparison signal and a fourth signal and generate the third signal based at least in part on the comparison signal and the fourth signal, the fourth signal indicating a second predetermined duration.

16. The system controller of claim 15 wherein the third switch is configured to receive the fourth signal.

17. The system controller of claim 16 wherein:
the third switch is configured to be closed in response to the fourth signal being at a first logic level; and
the third switch is configured to be open in response to the fourth signal being at a second logic level;
wherein the first logic level and the second logic level are different.

18. The system controller of claim 1 wherein the switch is a transistor.

19. A method for regulating a power converter, the method comprising:
receiving an input signal; and
outputting a drive signal to a switch to affect a current associated with a secondary winding of the power converter, the drive signal being associated with the input signal, an on-time period, and an off-time period, the on-time period including a first beginning and a first end;
wherein the outputting a drive signal to a switch includes:
detecting a demagnetization period associated with the secondary winding based at least in part on the input signal, the demagnetization period including a second beginning and a second end, the second beginning being the same as the first beginning, the second end following the first end;
determining a time duration from the first end to the second end, the time duration minus a first predetermined duration being equal to a duration difference; and
increasing the on-time period from a first duration to a second duration based at least in part on the duration difference.

20. The method of claim 19 wherein the increasing the on-time period from a first duration to a second duration based at least in part on the duration difference includes increasing the on-time period from the first duration to the second duration based at least in part on the duration difference to make the time duration equal to the first predetermined duration.

21. The method of claim 19 wherein the outputting a drive signal to a switch includes:
generating a first signal based on at least information associated with the input signal, the first signal indicating the demagnetization period; and
generating a second signal, the second signal indicating the first predetermined duration.

22. The method of claim 21 wherein the outputting a drive signal to a switch further includes:
receiving the first signal and the second signal; and
generating a third signal based at least in part on the first signal and the second signal, the third signal indicating the on-time period and the off-time period.

23. The method of claim 22 wherein the outputting a drive signal to a switch further includes:
receiving the third signal; and
generating the drive signal based at least in part on the third signal.

24. The method of claim 22 wherein the generating a third signal based at least in part on the first signal and the second signal includes:
receiving the first signal;
generating a pulse signal based at least in part on the first signal, the pulse signal indicating the time duration from the first end to the second end;
receiving the pulse signal and the second signal;
generating a voltage signal based at least in part on the pulse signal and the second signal, the voltage signal being related to the duration difference;
receiving the voltage signal; and
generating the third signal based at least in part on the voltage signal.

25. The method of claim 24 wherein the outputting a drive signal to a switch further includes receiving a fourth signal, the fourth signal indicating a second predetermined duration.

26. The method of claim 25 wherein the outputting a drive signal to a switch further includes generating the third signal based at least in part on the fourth signal, the third signal indicating the on-time period being equal to the second predetermined duration.

27. The method of claim 24, and further comprising:
receiving the third signal;
wherein the generating a pulse signal based at least in part on the first signal includes generating the pulse signal based at least in part on the first signal and the third signal.

* * * * *